US009490704B2

United States Patent
Jang et al.

(10) Patent No.: US 9,490,704 B2
(45) Date of Patent: Nov. 8, 2016

(54) SYSTEM AND METHODS FOR CONTROLLING SECONDARY SIDE SWITCHES IN RESONANT POWER CONVERTERS

(71) Applicant: Delta Electronics, Inc., Neihu (TW)

(72) Inventors: Yungtaek Jang, Chapel Hill, NC (US); Milan M. Jovanović, Cary, NC (US)

(73) Assignee: DELTA ELECTRONICS, INC., Neihu (TW)

( * ) Notice: Subject to any disclaimer, the term of this patent is extended or adjusted under 35 U.S.C. 154(b) by 166 days.

(21) Appl. No.: 14/179,496

(22) Filed: Feb. 12, 2014

(65) Prior Publication Data

US 2015/0229225 A1   Aug. 13, 2015

(51) Int. Cl.
- *H02M 3/335* (2006.01)
- *H02M 3/28* (2006.01)
- *H02M 1/00* (2006.01)

(52) U.S. Cl.
CPC ......... *H02M 3/285* (2013.01); *H02M 3/33569* (2013.01); *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC .................. H02M 2007/4815; H02M 3/1584
USPC ........... 363/17, 21.02, 21.03, 65, 67, 69–70, 363/74, 76–77; 307/82, 85–87
See application file for complete search history.

(56) References Cited

U.S. PATENT DOCUMENTS

| 6,301,128 | B1 | 10/2001 | Jang et al. | |
|---|---|---|---|---|
| 6,934,167 | B2 | 8/2005 | Jang et al. | |
| 6,970,366 | B2 | 11/2005 | Apeland et al. | |
| 7,596,007 | B2 * | 9/2009 | Phadke | H02M 3/285 363/71 |
| 7,843,708 | B2 * | 11/2010 | Seong | H02M 3/3376 363/127 |
| 7,859,860 | B2 * | 12/2010 | Chen | H02M 3/33592 363/127 |

(Continued)

OTHER PUBLICATIONS

Kim, Jong-Woo et al.; A New LLC Series Resonant Converter with a Narrow Switching Frequency Variation and Reduced Conduction Losses; accepted for publication in a future issue of IEEE Journal; pp. 1-38. Oct. 17, 2013.

(Continued)

*Primary Examiner* — Jessica Han
*Assistant Examiner* — David A. Singh
(74) *Attorney, Agent, or Firm* — VLP Law Group LLP; Edward C. Kwok

(57) ABSTRACT

Control methods for resonant converters offer improved performance in resonant converters that operate with a wide input-voltage range or a wide output-voltage range (or both) by substantially reducing the switching-frequency range. Reduction in the switching frequency range is achieved by controlling the output voltage with a combination of variable-frequency control and time-delay control. Variable-frequency control may be used to control the primary switches of an isolated resonant converter, while delay-time control may be used to control secondary-side rectifier switches provided in place of diode rectifiers. The secondary-side control may be implemented by sensing the secondary current or the primary current (or both) and by delaying the turning-off of the corresponding secondary switch with respect to the zero crossings in the secondary current or the primary current.

35 Claims, 21 Drawing Sheets

(56) References Cited

U.S. PATENT DOCUMENTS

| | | | | |
|---|---|---|---|---|
| 2003/0026115 A1* | 2/2003 | Miyazaki | H02M 3/33576 | 363/53 |
| 2005/0281058 A1* | 12/2005 | Batarseh | H02M 3/33576 | 363/16 |
| 2007/0030717 A1* | 2/2007 | Luger | H02J 7/35 | 363/132 |
| 2007/0115700 A1* | 5/2007 | Springett | H02M 3/33592 | 363/24 |
| 2009/0027929 A1* | 1/2009 | Kim | H02M 3/1584 | 363/65 |
| 2009/0051346 A1* | 2/2009 | Manabe | B60L 11/1887 | 323/363 |
| 2010/0054008 A1* | 3/2010 | Schaible | H02M 3/33592 | 363/127 |
| 2011/0103097 A1* | 5/2011 | Wang | H02M 3/33592 | 363/17 |
| 2011/0149607 A1* | 6/2011 | Jungreis | H02M 3/3376 | 363/21.02 |
| 2011/0228566 A1* | 9/2011 | Liang | H02M 1/32 | 363/21.02 |
| 2012/0153730 A1 | 6/2012 | Barnett et al. | | |
| 2012/0262953 A1* | 10/2012 | Jungreis | H02M 3/285 | 363/17 |

OTHER PUBLICATIONS

Jovanovic, Milan M.; Resonant, quasi-resonant, multi-resonant and soft-switching techniques-merits and limitations; received Jan. 6, 1994; invited paper for INT. J. Electronics, 1994, vol. 77, No. 5, pp. 537-554.

Hu, Zhiyuan et al.; An Interleaving and Load Sharing Method for Multiphase LLC Converters; article for IEEE; pp. 1421-1428. Mar. 17-21, 2013.

* cited by examiner

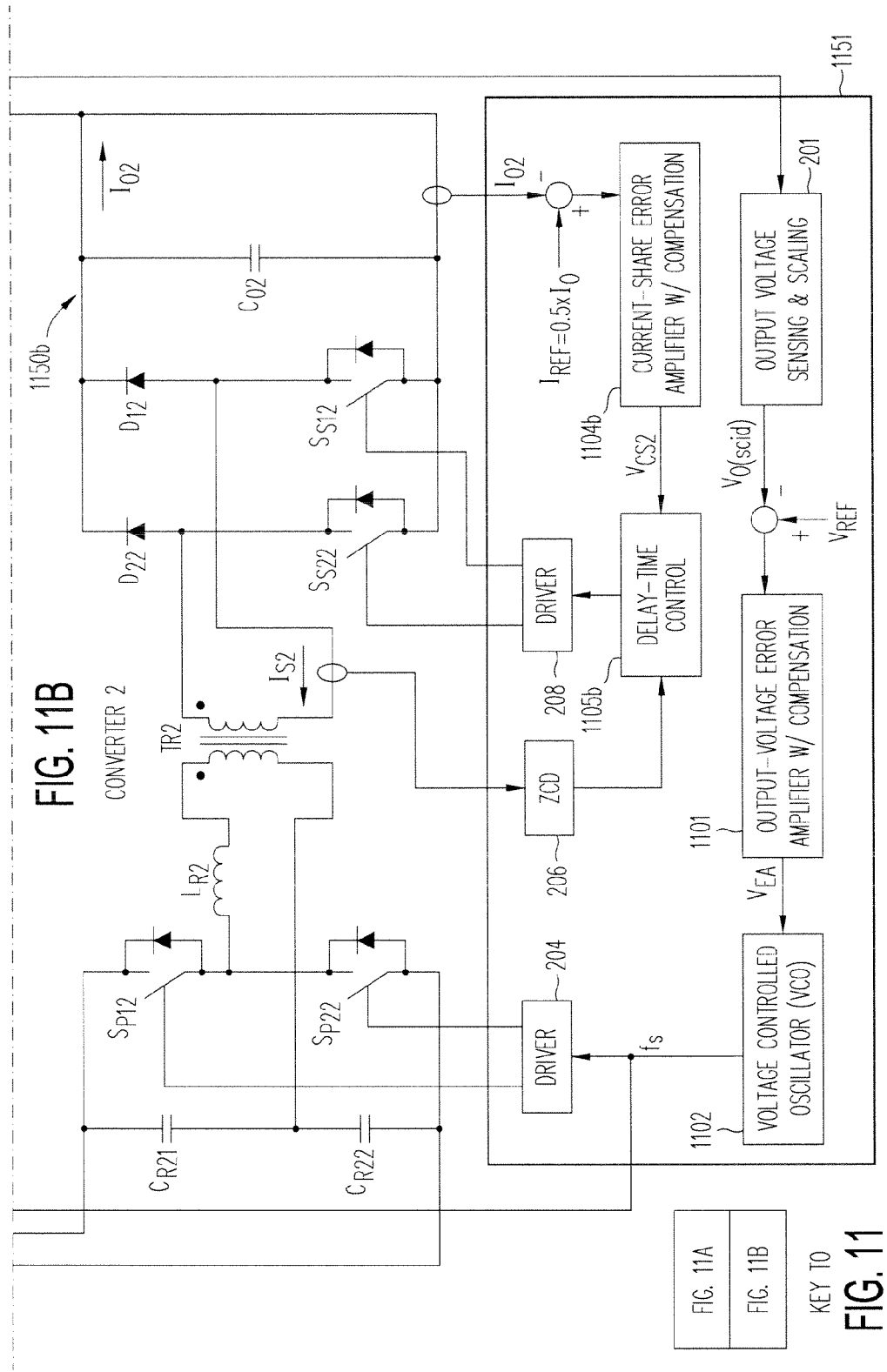

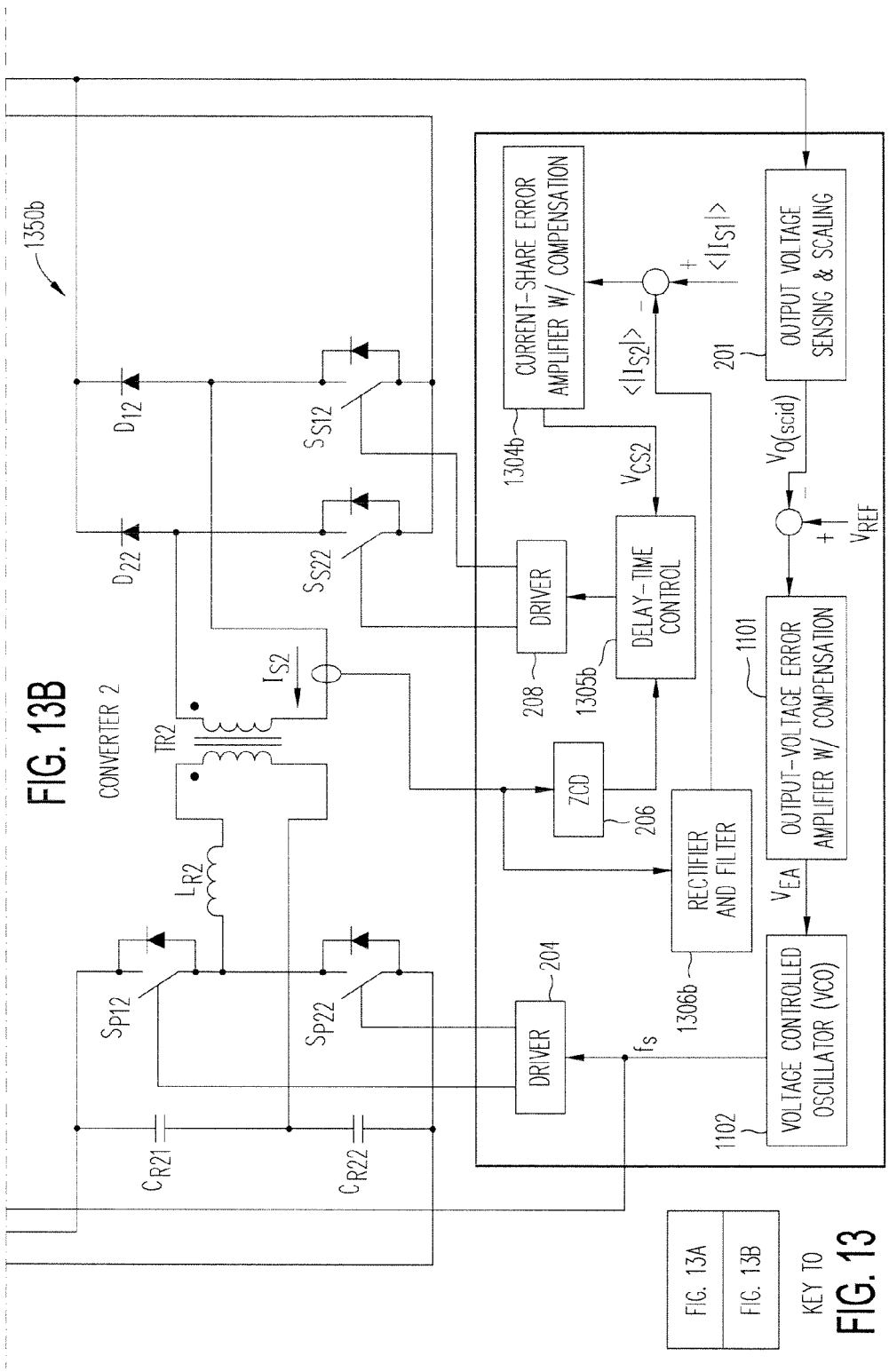

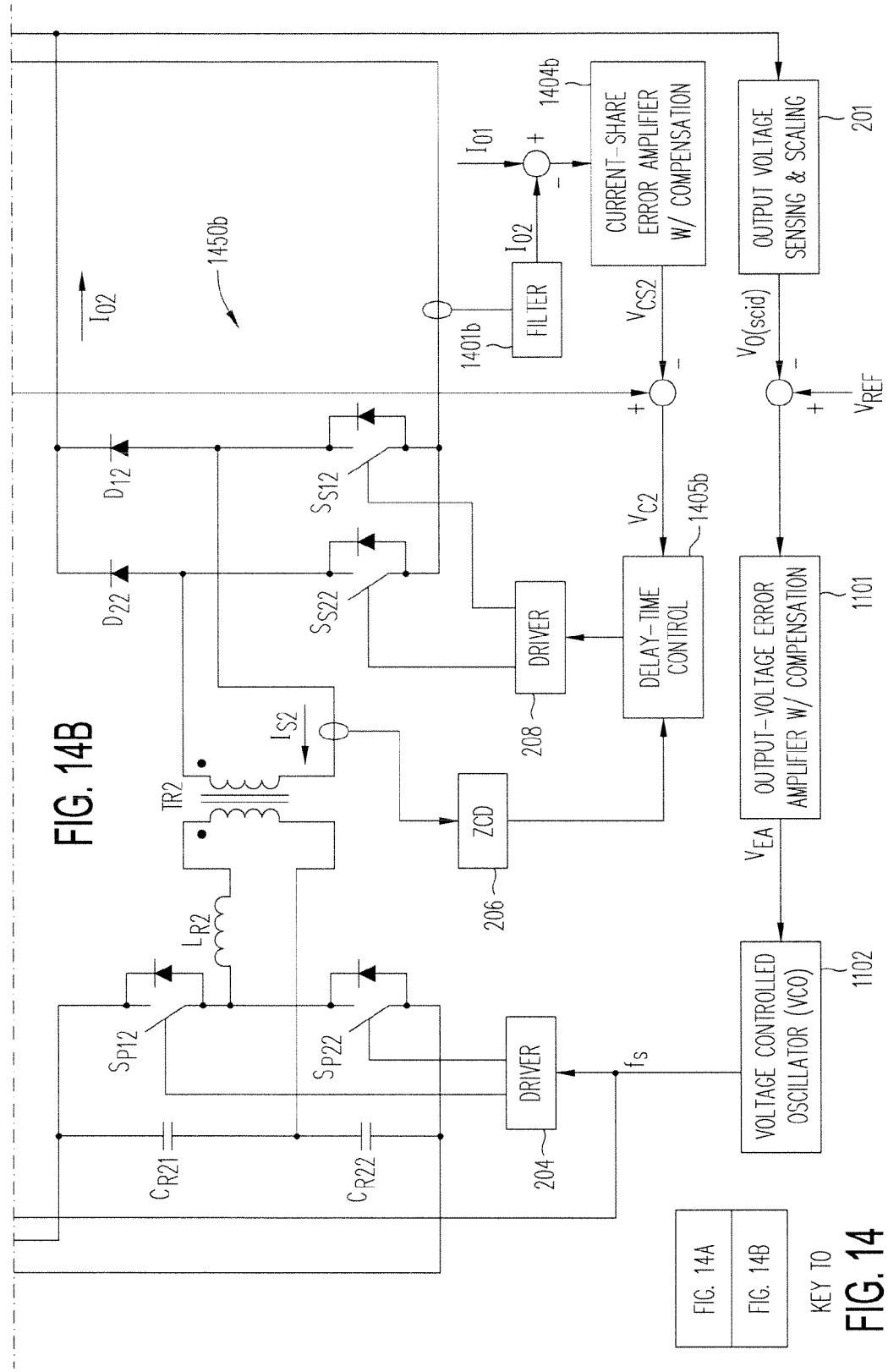

SYSTEM AND METHODS FOR CONTROLLING SECONDARY SIDE SWITCHES IN RESONANT POWER CONVERTERS

BACKGROUND OF THE INVENTION

1. Field of the Invention

The present invention relates to control methods used in resonant converters. More particularly, the present invention relates to individual converter control and paralleled resonant converters with active current-sharing control.

2. Description of the Prior Art

Generally, a resonant converter uses a resonant-tank circuit to shape switch voltages or current waveforms, or both, to minimize switching losses and to allow high-frequency operations without compromising conversion efficiency. Resonant converters are therefore extensively used in state-of-the-art power supplies that offer the highest power densities and efficiencies. Resonant converters are also preferred as power supply circuits for medical applications because of their superior electromagnetic interference (EMI) performance relative to their "hard"-switched counterparts. As resonant converters absorb component parasitics into their resonant-tank circuit (e.g., output capacitance of semiconductor switches, leakage or magnetizing inductance of transformers, or any combination thereof), resonant converters are used in applications where the parasitics are pronounced, such as high-voltage power supply circuits and contactless or inductive power transfer applications.

FIGS. 1(a) and 1(b) show two typical topologies for isolated resonant power converters. FIG. 1(a) shows a half-bridge topology, in which the resonant tank circuit includes inductor $L_R$ and capacitors $C_{R1}$ and $C_{R2}$. FIG. 1(b) shows a full-bridge topology, in which the resonant tank circuit includes inductor $L_R$ and capacitor $C_R$. Because in both resonant tank circuits the resonant inductor is connected in series with the resonant capacitor or capacitors, the circuits of FIGS. 1(a) and (b) are series-resonant converters. If the magnetizing inductance of transformer TR is relatively small (e.g., only several times the inductance of resonant inductor $L_R$), the converters operate as LLC series-resonant converters. To maximize conversion efficiency in applications with relatively low output voltages (e.g., 60 volts or less), secondary-side diode rectifiers are usually provided by synchronous rectifiers. In FIGS. 1(a) and 1(b), the synchronous rectifiers are implemented by low on-resistance metal-oxide-semiconductor field effect transistors ("MOSFETs"). Using MOSFETs as synchronous rectifiers also makes the resulting converter bidirectional because controllable switches on both the primary side and the secondary side of the transformer allow power to flow in both directions. The secondary side of an isolated resonant converter can be implemented by a single secondary winding and a full-wave rectifier, rather than the center-tapped secondary winding shown in FIGS. 1(a) and (b).

Generally, a resonant converter operates with variable switching-frequency control. When operating above the resonant frequency, a resonant converter operates with zero voltage-switching (ZVS) in the primary switches. Alternatively, when operating below the resonant frequency, a resonant converter operates with zero current-switching (ZCS). The article "Resonant, Quasi-Resonant, Multi-Resonant, and Soft-Switching Techniques—Merits and Limitations," by M. M. Jovanović, published in the International Journal of Electronics, Vol. 77, no. 5, pp. 537-554, November 1994, discloses in detail resonant converter topologies and control.

FIG. 1(c) shows waveforms of switch-control signals for ZVS operation in series-resonant converters, such as those shown in FIGS. 1(a) and (b). As shown in FIG. 1(c), each switch operating with a 50% duty ratio, with the primary switches of the same leg (i.e., switches $S_{P1}$ and $S_{P2}$, or $S_{P3}$ and $S_{P4}$) operate in a substantially complementary (i.e., non-overlapping) fashion to avoid cross-conduction. A feedback control loop providing output regulation determines the frequency of primary switch operations. On the secondary side, the synchronous rectifier switches are synchronized to switch at the zero crossings of the resonant current. Specifically, synchronous rectifier $S_{S1}$ is synchronized to turn on at the moment resonant current $i_P$ changes from negative to positive and turn off at the moment resonant current $i_P$ changes from positive to negative, while synchronous rectifier $S_{S2}$ is synchronized to turn on at the moment resonant current $i_P$ changes from positive to negative and turn off at the moment resonant current $i_P$ changes from negative to positive, as illustrated in FIG. 1(c). To achieve ZVS in a practical implementation, the duty ratio of each primary switch is set to a value that is slightly less than 50% by introducing a short delay between the turning-off and the turning-on of its complementary switch in the same leg. During this dead time (i.e., when neither complementary switch is closed), the current is commutated from the switch that is being turned off to the anti-parallel diode in the complementary switch, so as to create a condition for the complementary switch's subsequent ZVS turning on. Typically, each secondary-side synchronous rectifier of the resonant converter is also operated with a duty ratio that is slightly less than 50%.

Variable switching-frequency control is generally seen as a drawback of a resonant converter, especially in an application with a wide input voltage range or a wide output voltage range. Specifically, as the input or output voltage range increases, the control frequency range also increases, so that driving and magnetic component losses also increase, thereby reducing conversion efficiency. Furthermore, in many applications, the converter is restricted to operate within a relatively limited frequency range to avoid interfering with other parts of the system. While a resonant converter can operate with a constant frequency (i.e., in a "clamp-mode" operation), such an operation is not desirable because the increased circulating energy in the resonant tank circuit significantly degrades conversion efficiency.

In a series-resonant converter, such as that shown in FIG. 1(a) or FIG. 1(b), the output voltage ripple is determined by the AC-component of the secondary-side rectified resonant current flowing through output capacitor $C_O$. Such a converter is more suited for a relatively low output current operation. To achieve a low output-voltage ripple in a high-current application, a lager output capacitor is required. The output capacitor is typically implemented by parallel electrolytic capacitors or ceramic capacitors. For converter applications that require a relatively long life time (e.g., an automotive on-board charger, an automotive DC/DC converter, a solar inverter, or an LED driver), it is not desirable to use electrolytic capacitors.

The output capacitor can be significantly reduced by interleaving—i.e., by operating multiple converters in parallel and providing a phase shift between the gate-drive signals. Interleaving substantially cancels the current ripples at the input and output. By interleaving, a resonant converter with a relatively small C-type output capacitor (e.g., the resonant converters of FIGS. 1(a) and (b)) can be used in a high output current application. However, interleaving variable frequency-controlled resonant converters requires that the switching frequencies be synchronized (i.e., the parallel converters operate at the same variable frequency). However, because of the inevitable mismatch between the resonant tank components, the interleaved resonant converters would not equally share a load current (or power) even with identical input and output voltages and switching frequency. Therefore, when mismatched components are present, additional control means (i.e., a control mechanism that is independent of the switching-frequency control) is required to achieve an acceptable current sharing among the interleaved resonant converters.

U.S. Patent Application Publication 2012/0153730, entitled "Interleaved LLC Converter Employing Active Balancing," discloses a control method for interleaving LLC converters with active current balancing. Under that control method, the input terminals of each interleaved converter is connected to a separate DC power source and the power source voltages (i.e., the input voltages of the LLC converters) are controlled to achieve and to maintain current balance between the interleaved converters. Such a method cannot be applied in an application where the input voltages of the LLC converters are not controllable or if only one DC power source is available.

SUMMARY

The present invention provides control methods for resonant converters that offer improved performance. Specifically, the control methods of the present invention provide improved performance in resonant converters that operate with a wide input-voltage range or a wide output-voltage range (or both) by substantially reducing the switching-frequency range. Reduction in the switching frequency range is achieved by controlling the output voltage with a combination of variable-frequency control and time-delay control. According to one embodiment of the present invention, variable-frequency control may be used to control the primary switches of an isolated resonant converter, while delay-time control may be used to control secondary-side rectifier switches provided in place of diode rectifiers. The secondary-side control may be implemented by sensing the secondary current or the primary current (or both) and by delaying the turn ing-off of the corresponding secondary switch with respect to the zero crossings in the secondary current or the primary current. Generally, the delay time is responsive to the input voltage, the output voltage, or both. According to one embodiment of the present invention, the primary and secondary switches operate with substantially the same switching frequency and each having a duty ratio of approximately 50%. To achieve ZVS operation, a short dead time is introduced between the turning-off instant of a primary switch and the corresponding turning-on instant in the complementary primary switch.

According to one embodiment of the present invention, a control method provides active current-sharing control between paralleled resonant converters, including interleaved resonant converters. The load current of each paralleled converter is directly or indirectly sensed from the secondary current, the primary current or both. The current difference between the sensed current value and a desired reference current is used to adjust the delay time of each paralleled converter, so that the sensed currents of the paralleled converters are substantially equal. This current-sharing delay-time control supplements the delay-time control that is responsive to the input or output voltage (or both).

The control methods of the present invention are applicable to both isolated and non-isolated series-resonant converters. In non-isolated converters, time-delay control is derived from sensing the zero crossings of one or more resonant tank currents and from delaying the turning-off of the corresponding rectifier switch for an amount of time based on the input voltage or the output voltage (or both).

The present invention is better understood upon consideration of the following detailed description and accompanying figures.

BRIEF DESCRIPTION OF THE DRAWINGS

Like elements in the figures are assigned like reference numerals.

DETAILED DESCRIPTION OF THE PREFERRED EMBODIMENTS

Figure 1A:
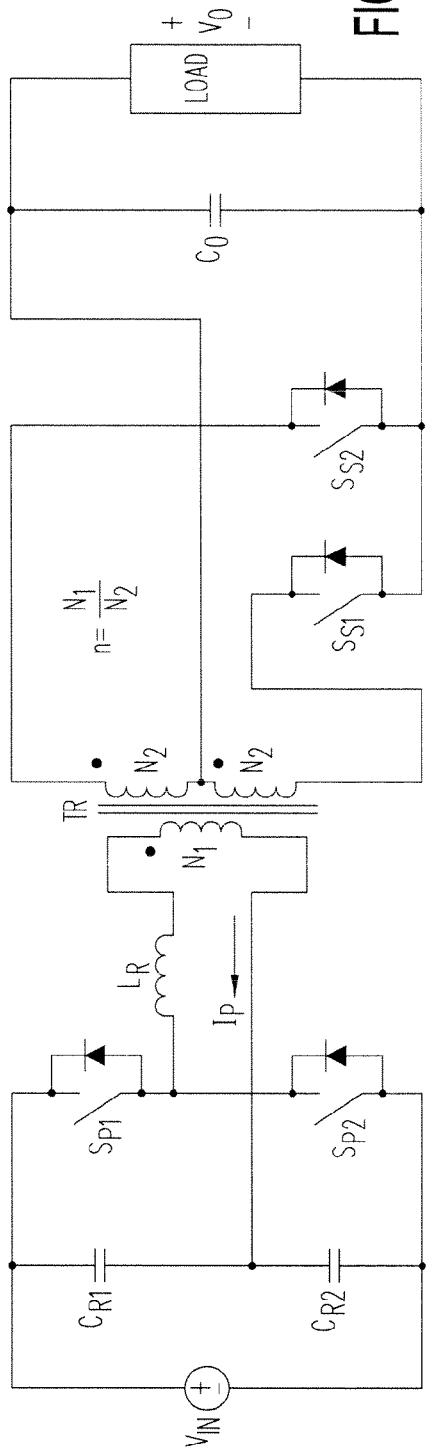
FIGS. 1(a) and 1(b) show a half-bridge topology and a full-bridge topology, respectively, for typical isolated resonant power converters.
Figure 1B:
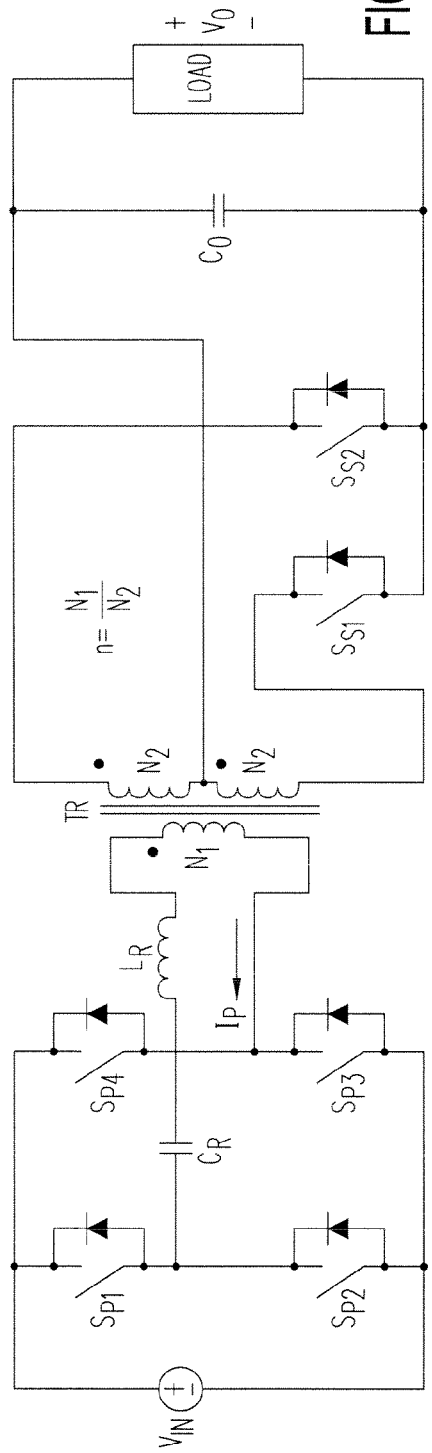
Figure 2:
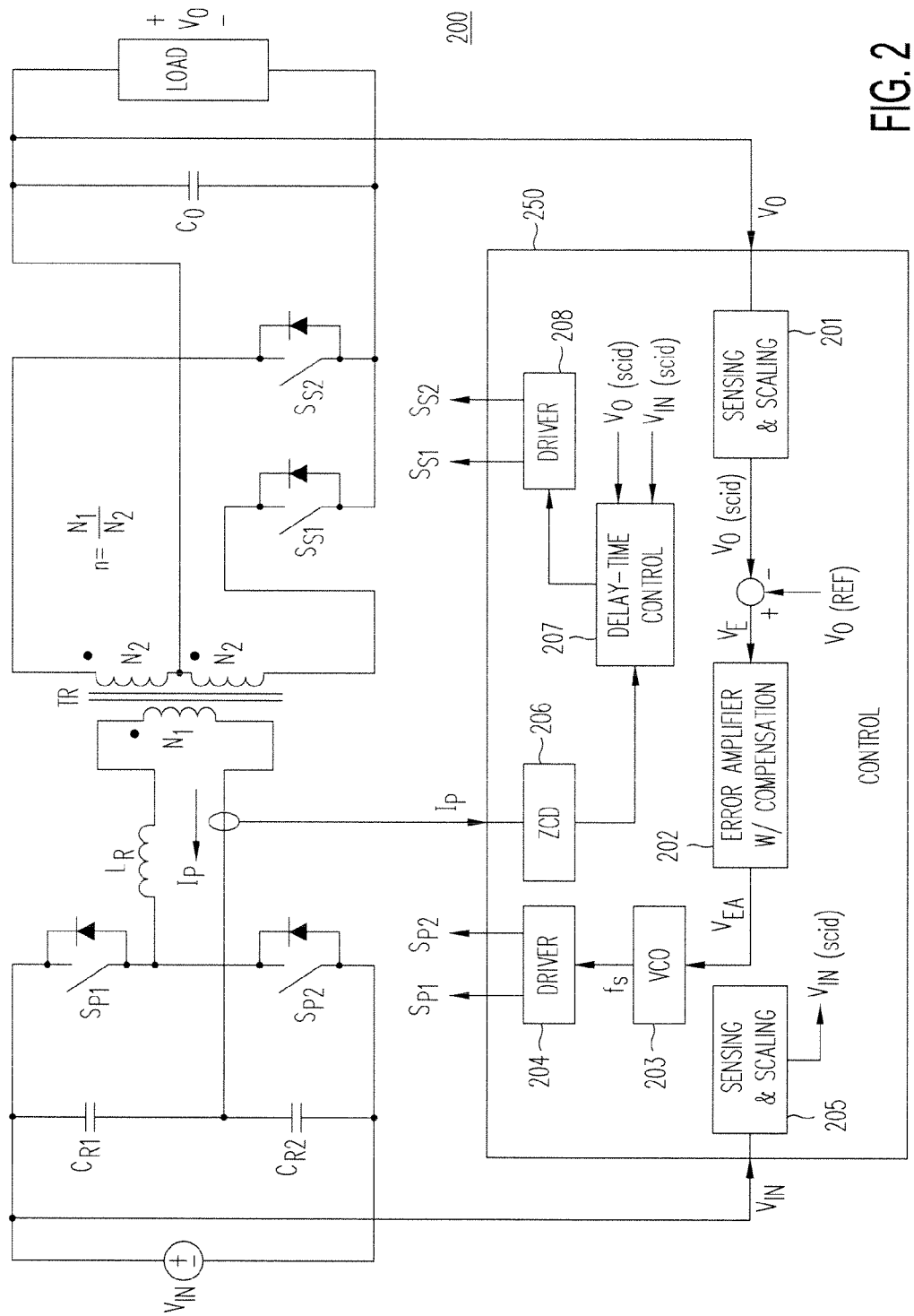
FIG. 2 illustrates a control method in isolated half-bridge series-resonant converter 200 with a center-tap secondary winding in transformer TR, according to one exemplary embodiment of the present invention.

FIG. 2 illustrates a control method in isolated half-bridge series-resonant converter 200 with a center-tap secondary winding in transformer TR, according to one exemplary embodiment of the present invention. (Except for its control circuit, half-bridge series resonant converter 200 has the same topology as the half-bridge resonant converter of FIG. 1(a)). As shown in FIG. 2, the half-bridge series-resonant converter 200 uses an isolation transformer TR with a center-tapped secondary winding. The primary side of the converter includes switches $S_{P1}$ and $S_{P2}$, resonant capacitors $C_{R1}$ and $C_{R2}$, and resonant inductor $L_R$. The secondary side of the resonant converter includes switches $S_{S1}$ and $S_{S2}$ and output or filter capacitor $C_O$, which is coupled across the load. Alternatively, filter capacitor $C_O$ may be coupled to the load through a second-stage LC filter. Even when present, the second-stage LC filter does not substantively affect the control method of the present invention. Accordingly, the second-stage LC filter is not included in this detailed description to simplify the figure and its related descriptions.

Figure 3:
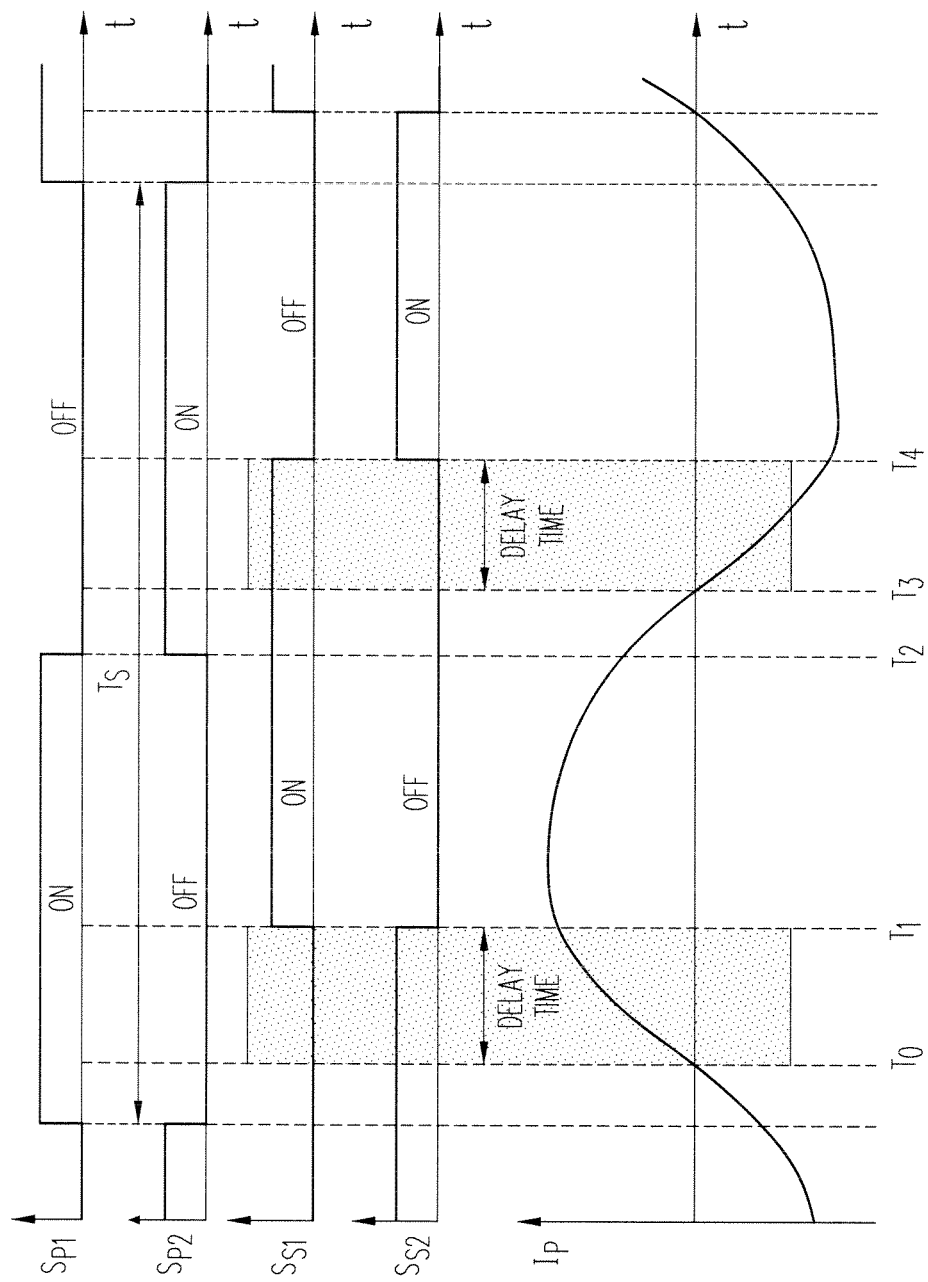
FIG. 3 shows waveforms of primary switches $S_{P1}$ and $S_{P2}$, secondary switches $S_{S1}$ and $S_{S2}$, and primary current $I_P$ in half-bridge resonant converter 200 of FIG. 2, according to one embodiment of the present invention.

As illustrated in FIG. 2, output voltage regulation is achieved using a combination of variable-frequency control and time-delay control. Specifically, variable-frequency control is applied to primary switches $S_{P1}$ and $S_{P2}$, and delay-time control is applied to secondary-side switches $S_{S1}$ and $S_{S2}$. FIG. 3 shows waveforms of primary switches $S_{P1}$ and $S_{P2}$, secondary switches $S_{S1}$ and $S_{S2}$, and primary current $I_P$ in half-bridge resonant converter 200 of FIG. 2, according to one embodiment of the present invention. As shown in FIG. 3, waveforms for switches $S_{P1}$, $S_{P2}$, $S_{S1}$, and $S_{S2}$ show that these switches all operate with the same switching frequency, each having a duty cycle of approximately 50%.

Controller 250 receives output voltage $V_O$, which is scaled by the sensing and scaling circuit 201 to provide scaled voltage $V_{O(scld)}$. Error signal $V_E$ is generated by subtracting a reference output voltage (voltage $V_{O(REF)}$) from scaled voltage $V_{O(scld)}$. From error signal $V_E$, compensated error amplifier 202 provides amplified error signal $V_{EA}$, which sets frequency $f_S$ for voltage-controlled oscillator (VCO) 203. VCO 203, in turn, regulates primary switches $S_{P1}$ and $S_{P2}$ at switching frequency $f_S$. To achieve zero-voltage switching in the complementary primary switches of the same leg (e.g., primary switches $S_{P1}$ and $S_{P2}$), a small dead time is provided between the turning-on instants and the turning-off instants of these complementary switches.

Controller 250 provides delay-time control to secondary switches $S_{S1}$ and $S_{S2}$ based on sensed primary current $I_P$ in transformer TR. As shown in FIG. 3, controller 250 delays the turning-off of the corresponding secondary switches relative to the zero crossings in primary current $I_P$. The delay time is determined by delay time control circuit 207 based on zero crossings of primary current $I_P$ detected in zero-current detector (ZCD) 206, and one or both of scaled output voltage $V_{O(scld)}$ and scaled input voltage $V_{IN(scld)}$. Delay-time control reduces the control frequency range of the resonant converter in an application with a wide input voltage range or a wide output voltage range. In an application with a substantially constant output voltage and a wide input voltage range, the delay time is responsive only to the input voltage range. Similarly, in an application with a substantially constant input voltage and a wide output voltage range, the delay-time is responsive only to the output voltage range sensing of the input voltage is unnecessary).

ZCD 206 senses and scales received primary current $I_P$. Alternatively, instead of sensing primary current $I_P$, delay-time control according to the present invention may also be achieved by sensing one or more secondary currents. Where the magnetizing inductance of the transformer (measured on the primary side) is relatively high, such that the contribution of the magnetizing current to the primary current is negligible, the zero crossings in both the secondary current and the primary current occur substantially simultaneously (as $i_S = n \times i_P$). In that case, delay-time control performance is not affected by whether the primary current or the second current is sensed. The selection of which current to sense may be made based on such consideration as ease of sensing or cost. With a center-tap transformer, sensing the primary current is typically preferred because it requires less components. Also, sensing on the low current side is preferred over sensing on the high current side because of a lesser current-sensing loss. However, for a smaller magnetizing inductance, such as in series-resonant LLC converters, the delay-time control range may be affected by the choice of which side the current is sensed. Specifically, where magnetizing current $i_M$ is a non-negligible part of the primary resonant current, zero-crossings in the primary current and the secondary current are phase shifted relative to each other, as $i_S = n(i_P - i_M)$, so that the zero-crossings in the secondary current occur when $i_P = i_M$, i.e., for a non-zero primary current. The zero-crossings in the primary current are delayed by the time interval between the zero-crossing in the secondary current and the secondary current whereby the value $i_S = -n \times i_M$ is reached. Because in each cycle a zero-crossing in the secondary current occurs before a zero-crossing in the primary current, delay-time control based on primary-current sensing provides a delay time that is at least equal to the time difference between the zero-crossings of the primary current and the secondary current. With secondary-side sensing, the delay-time control can set the delay time all the way down to zero.

Figure 1C:
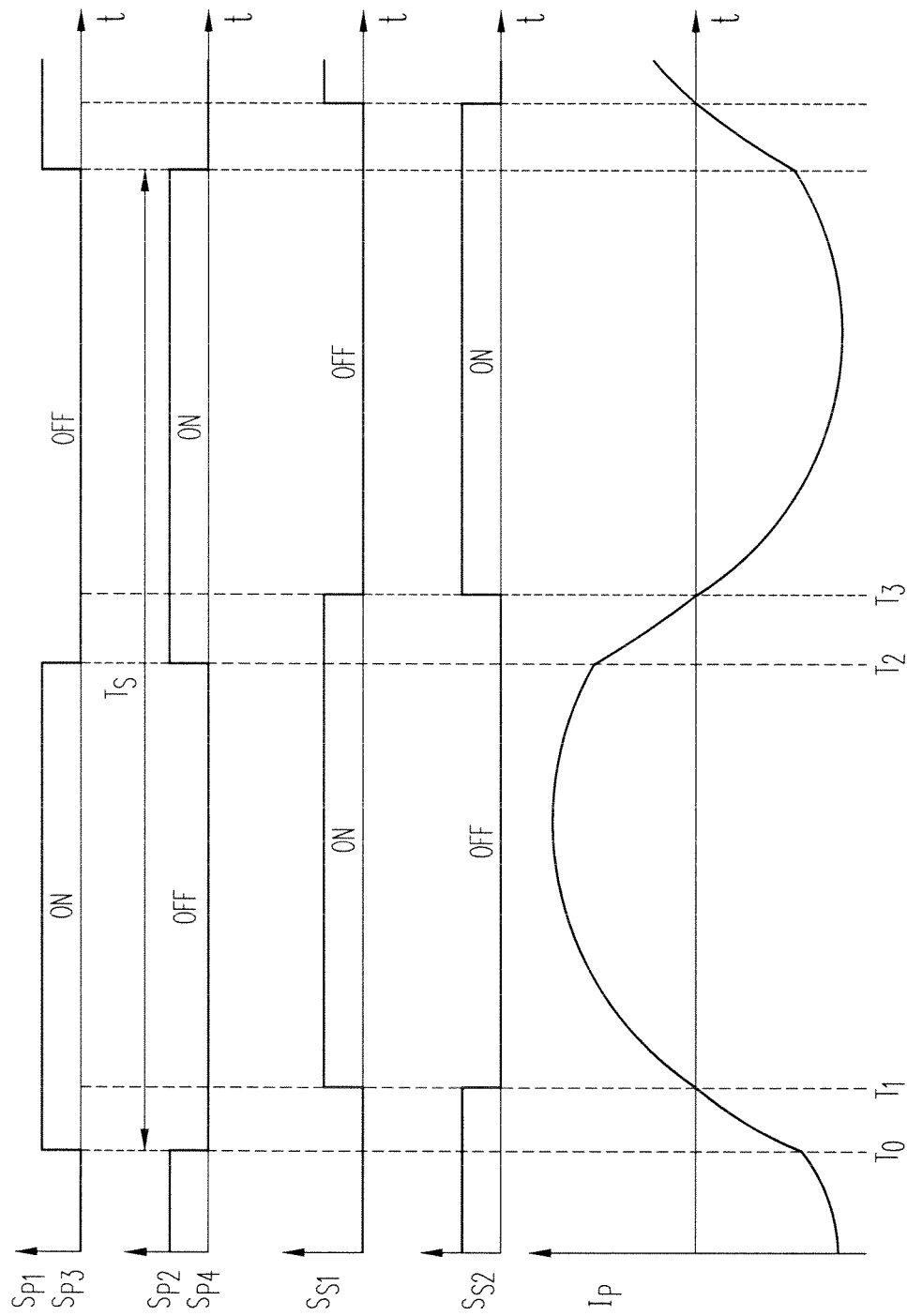
FIG. 1(c) shows timing diagrams of switch-control signals for ZVS operation in series-resonant converters, such as those shown in FIGS. 1(a) and (b).

As delay-time control increases the energy in the resonant tank circuit and makes the converter exhibit a boost characteristic, the control-frequency range is also reduced. Specifically, when the resonant converter of FIG. 1(a) is operated without delay-time control (i.e., with the control timing scheme of FIG. 1(c)), the voltage across resonant inductor $L_R$ is given by the difference between one-half of input voltage $V_{IN}$ and the primary-winding voltage (which is the reflected output voltage $nV_O$, for a transformer with a turns ratio of n). Therefore, during the time interval when primary switch Sp, and secondary switch $S_S$, are both conducting and primary current $i_P$ is positive, the voltage across resonant inductor $L_R$ (which increases the inductor current and, therefore, its energy) is $0.5V_{IN}$-$nV_O$. However, when delay-time-control is applied according to FIG. 3 to the secondary-side switches $S_{S1}$ and $S_{S2}$, the resonant-inductor voltage across inductor $L_R$ during interval $[T_O$-$T_1]$ is $0.5V_{IN}$+$nV_O$, because output voltage $V_O$ is connected to the resonant tank circuit with opposite polarity, as positive primary current $i_P$ induces a secondary current to flow through closed switch $S_{S2}$ and output capacitor $C_O$. With delay-time control applied to the secondary switches, a higher voltage is achieved across resonant inductor $L_R$ (hence, a higher amount of energy is stored in resonant inductor $L_R$). Therefore, under the same input voltage and switching frequency, secondary-side delay-time control provides a higher output voltage that is proportional to the delay time (i.e., the time when the secondary winding is connected to output voltage $V_O$ with opposite polarity). This boost characteristic makes optimizing circuit performance possible by selecting (i) a higher turns ratio in the transformer to reduce primary conduction losses and (ii) a higher magnetizing inductance to reduce circulating (i.e., magnetizing) current loss. Because of this boost characteristic, delay-time control according to the present invention is favored when operating in a low input voltage range or in a high output voltage range. Specifically, the maximum delay time, which is approximately $T_S/4$, where $T_S$ is the switching period, is set at the minimum input voltage or the maximum output voltage. This delay time is progressively reduced for higher input voltage or lower output voltage. (Therefore, delay-time control is typically not used at the middle and high input voltages, or nominal and low output voltages.) The control methods of the present invention may be implemented by either analog circuitry, digital control circuitry, or a combination of both. A microcontroller- or DSP-based implementation is preferred, as the delay time depends on input or output voltages, which are easily programmable.

Figure 4:
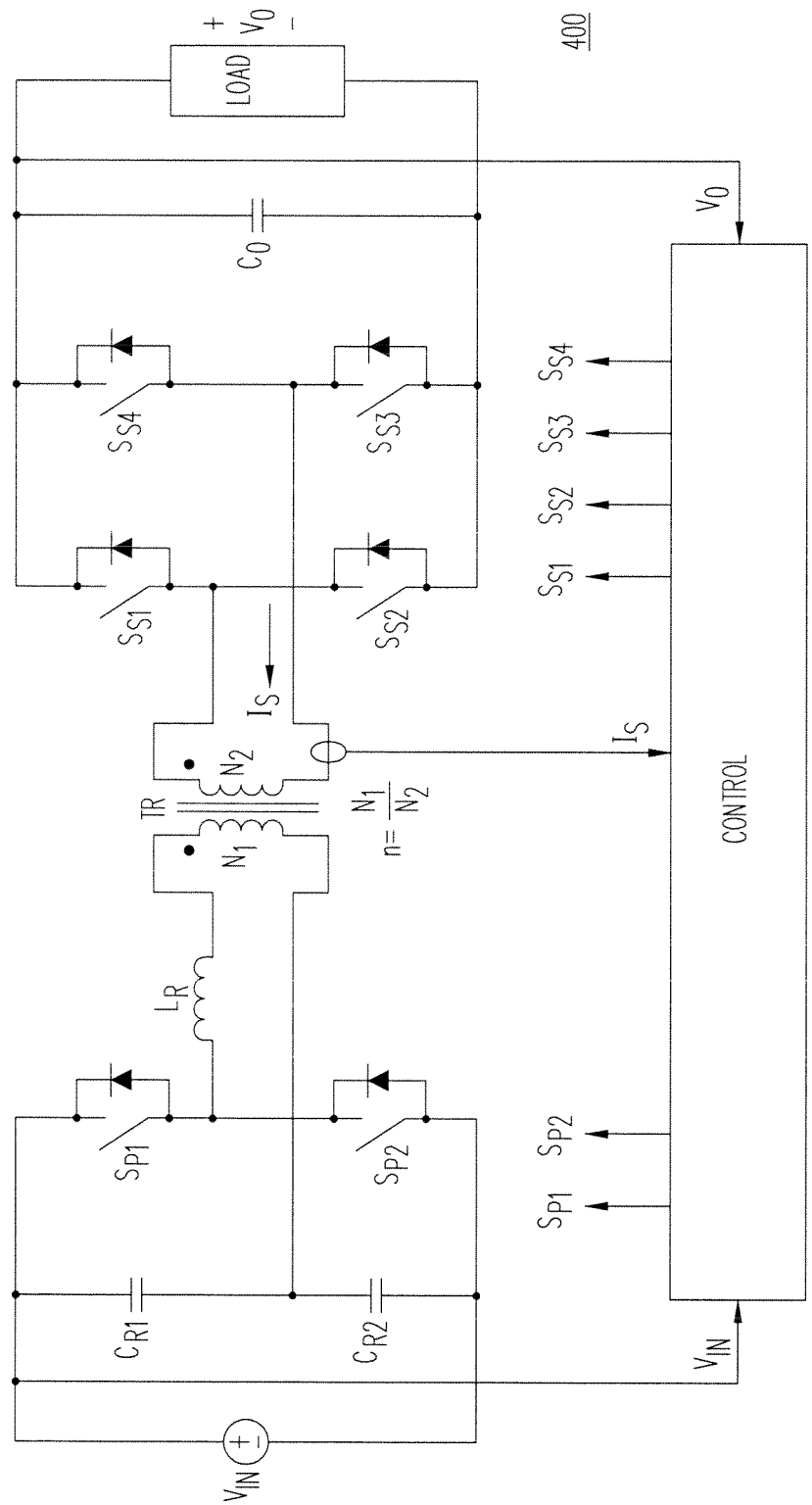
FIG. 4 shows half-bridge resonant converter 400 with a full-wave secondary-side rectifier and which uses secondary-current sensing, in accordance with one embodiment of the present invention.
Figure 5:
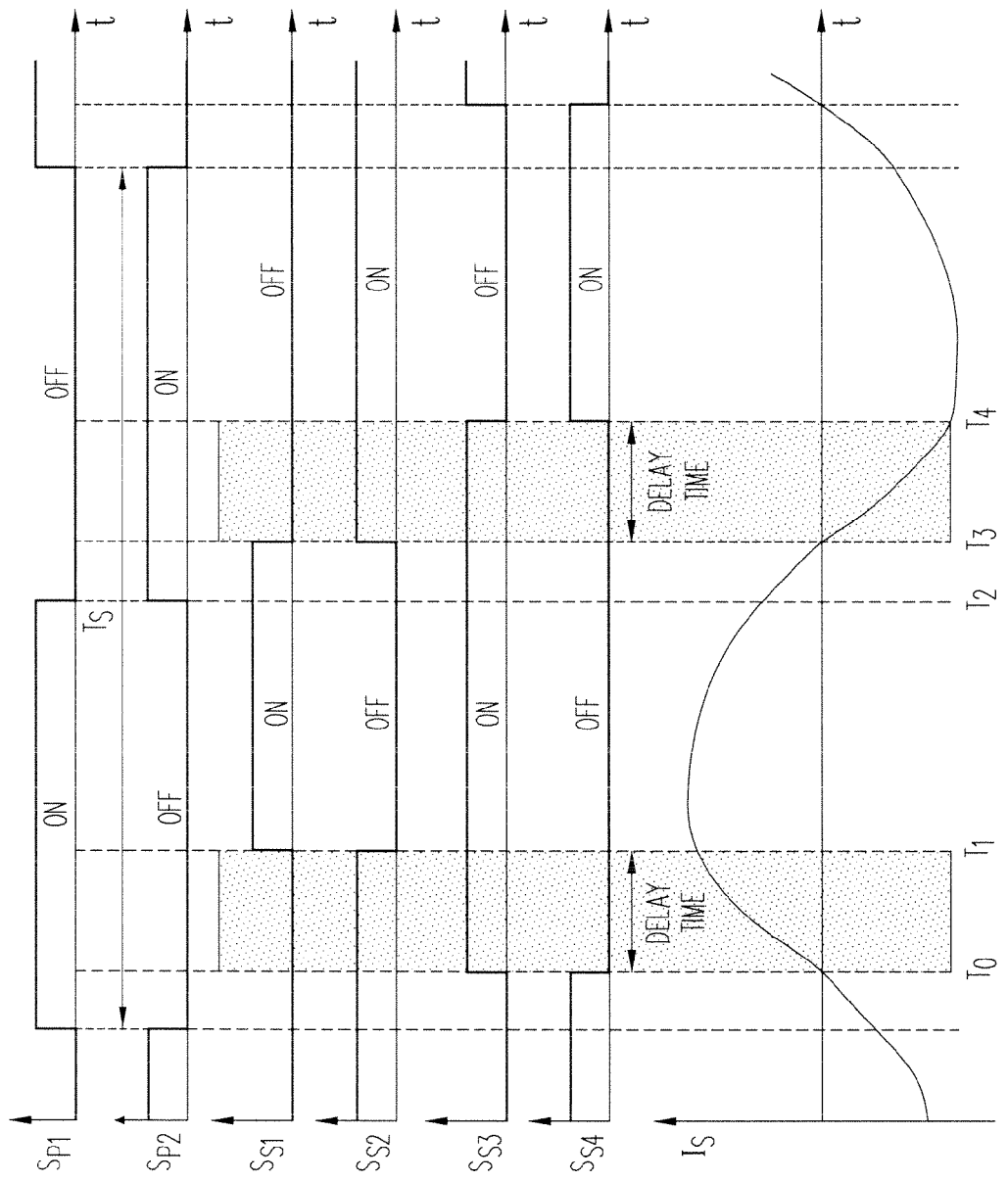
FIG. 5 shows waveforms of primary switches $S_{P1}$ and $S_{P2}$, secondary switches $S_{S1}$, $S_{S2}$, $S_{S3}$, and $S_{S4}$, and secondary current $I_S$ in full-bridge resonant converter 400 of FIG. 4, according to one embodiment of the present invention.

The control methods of the present invention are applicable to converters of any series-resonant topology. FIG. 4 shows half-bridge resonant converter 400 with a full-wave secondary-side rectifier and which uses secondary-current sensing, in accordance with one embodiment of the present invention. FIG. 5 shows waveforms of primary switches $S_{P1}$ and $S_{P2}$, secondary switches $S_{S1}$, $S_{S2}$, $S_{S3}$, and $S_{S4}$, and secondary current $I_S$ in resonant converter 400 of FIG. 4, according to one embodiment of the present invention. As shown in FIG. 5, secondary switches $S_{S2}$ and $S_{S3}$ are both conducting during delay-time intervals $[T_O$-$T_1]$ and $[T_3$-$T_4]$ to improve efficiency (i.e., thereby reducing the conduction times in the body diodes of secondary switches $S_{S2}$ and $S_{S3}$ when both switches carry negative currents). The voltage across resonant inductor $L_R$ during intervals $[T_O$-$T_1]$ and $[T_3$-$T_4]$ is $0.5V_{IN}$ because the secondary winding is effectively shorted, as positive primary current $i_P$ induces a secondary current to flow through closed switches $S_{S2}$ and $S_{S3}$. With delay-time control applied to the secondary switches, a higher voltage is achieved across resonant inductor $L_R$ than that without delay-time control.

In FIG. 5, switches in the same leg of the full-bridge operate in a substantially complementary fashion. To achieve switching under zero voltage condition in the complementary primary and secondary switches, a small dead time is provided between the turning-on and turning-off instants in these complementary switches.

Figure 6A:
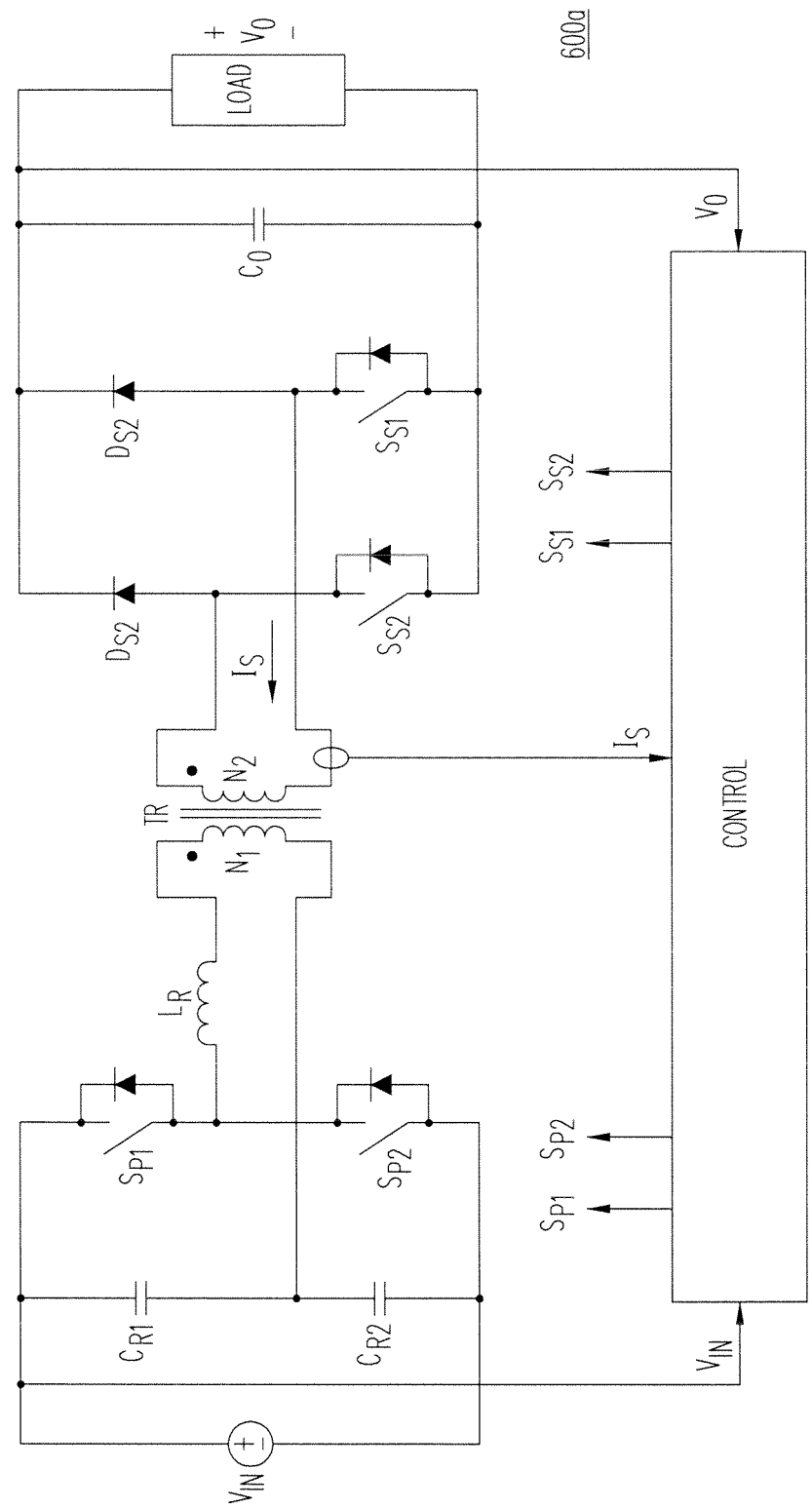
FIGS. 6(a) and 6(b) show half-bridge series-resonant converters with full-wave secondary-side rectifier implemented by two low-side switches and by two switches in totem-pole configuration, respectively, controlled in accordance with the present invention.
Figure 6B:
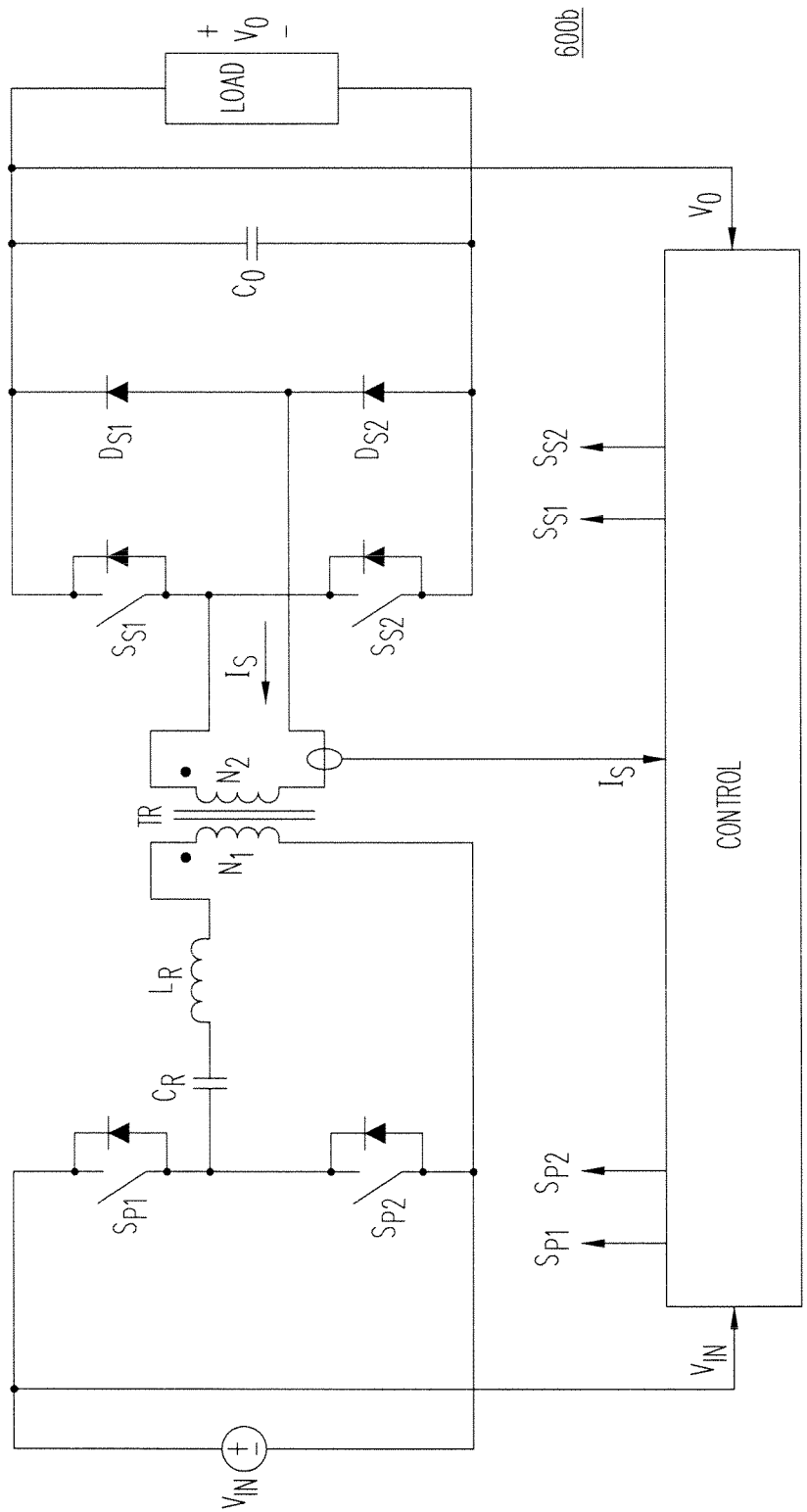
Figure 7:
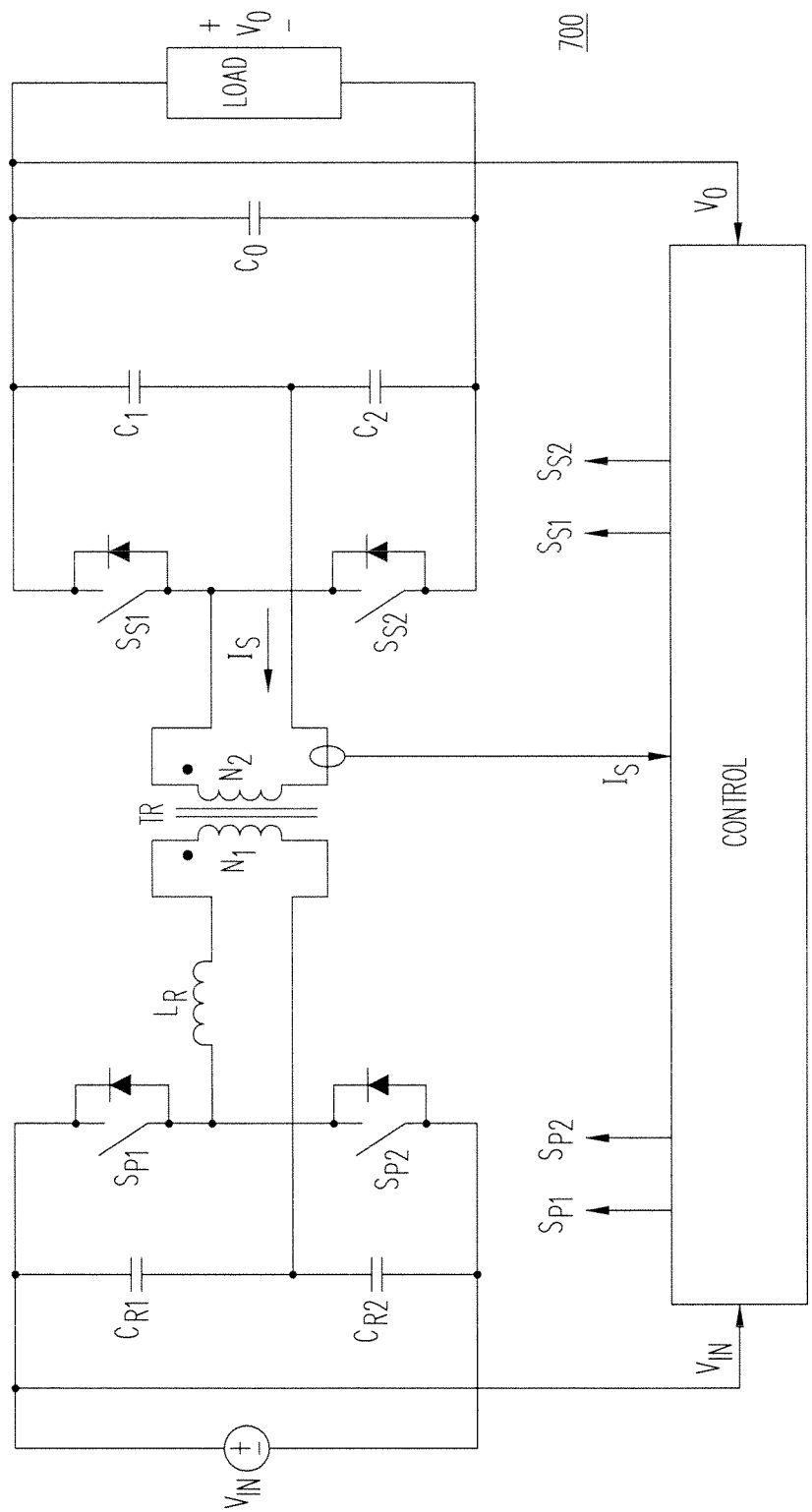
FIG. 7 shows a half-bridge resonant converter with a voltage doubler rectifier, controlled according to one embodiment of the present invention.
Figure 8:
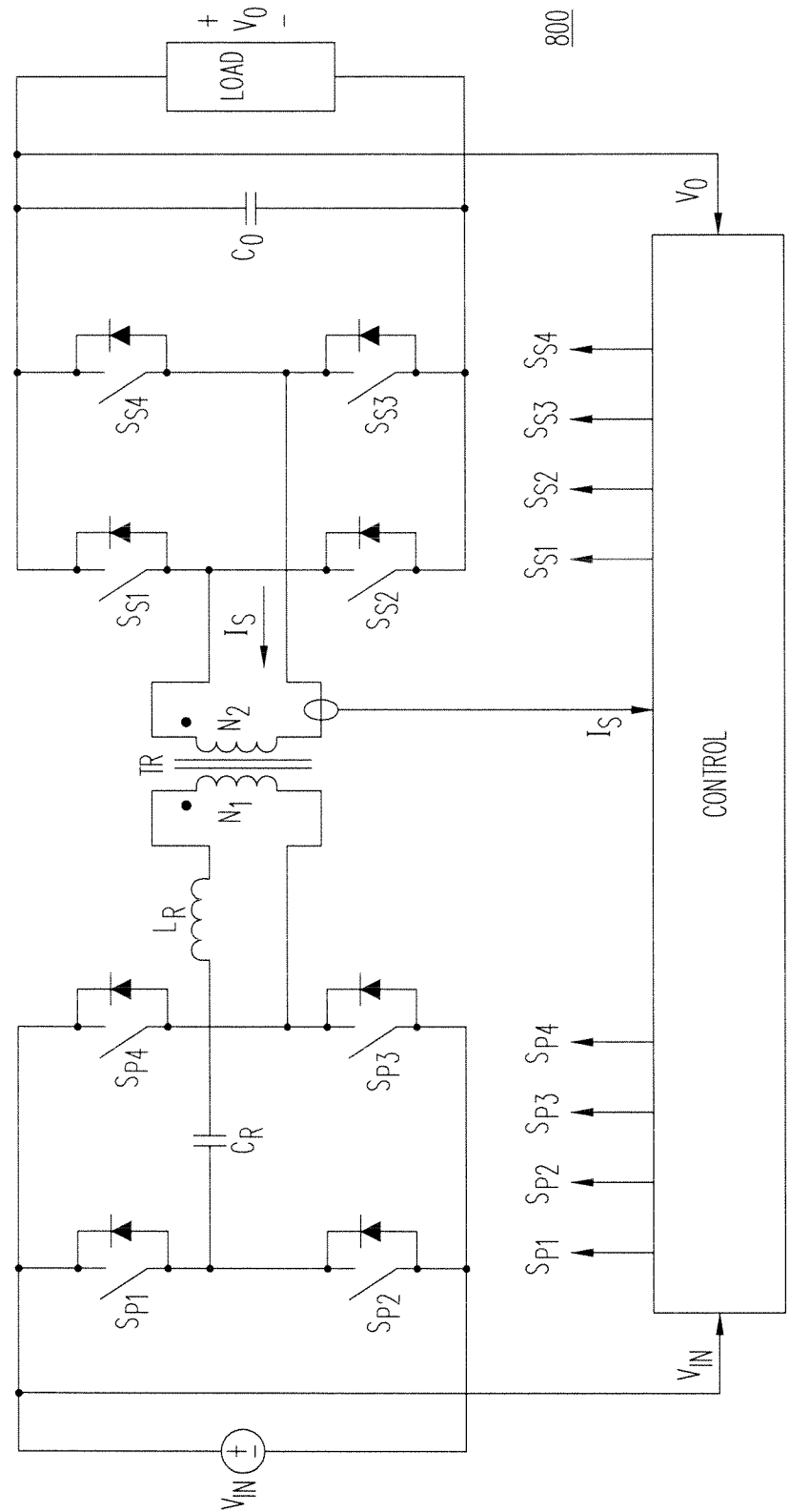
FIG. 8 shows a full-bridge series-resonant converter with a full-wave secondary-side rectifier, controlled according to one embodiment of the present invention.

FIGS. 6(a) and 6(b) illustrate examples of resonant converters that implement full-wave secondary-side rectifiers using two controllable switches. In addition to being applicable to resonant converters of FIGS. 6(a) and 6(b), the methods of the present invention are also applicable to (i) a half-bridge resonant converter with a voltage doubler rectifier, as shown in FIG. 7, and (ii) a full-bridge resonant converter with a full-wave rectifier, as shown in FIG. 8. In the converter of FIG. 8, diagonal primary switches $S_{P1}$ and $S_{P3}$ (and, likewise, diagonal primary switches $S_{P2}$ and $S_{P4}$) are simultaneously turned on and off, while secondary switches $S_{S1}$-$S_{S4}$ are operated according to the waveforms of secondary switches $S_{S1}$-$S_{S4}$ of FIG. 5.

The control methods of the present invention are also applicable to resonant converters that inductively transfer energy over a large distance between separated primary winding (transmitter) and secondary winding (receiver) of the transformer. In these embodiments with wireless power transfer, the output voltage, current, or power that is measured on the secondary side of the transformer may be transmitted over a high-frequency wireless communication network to the primary side of the transformer to regulate the amount of transferred inductive energy.

Figure 9:
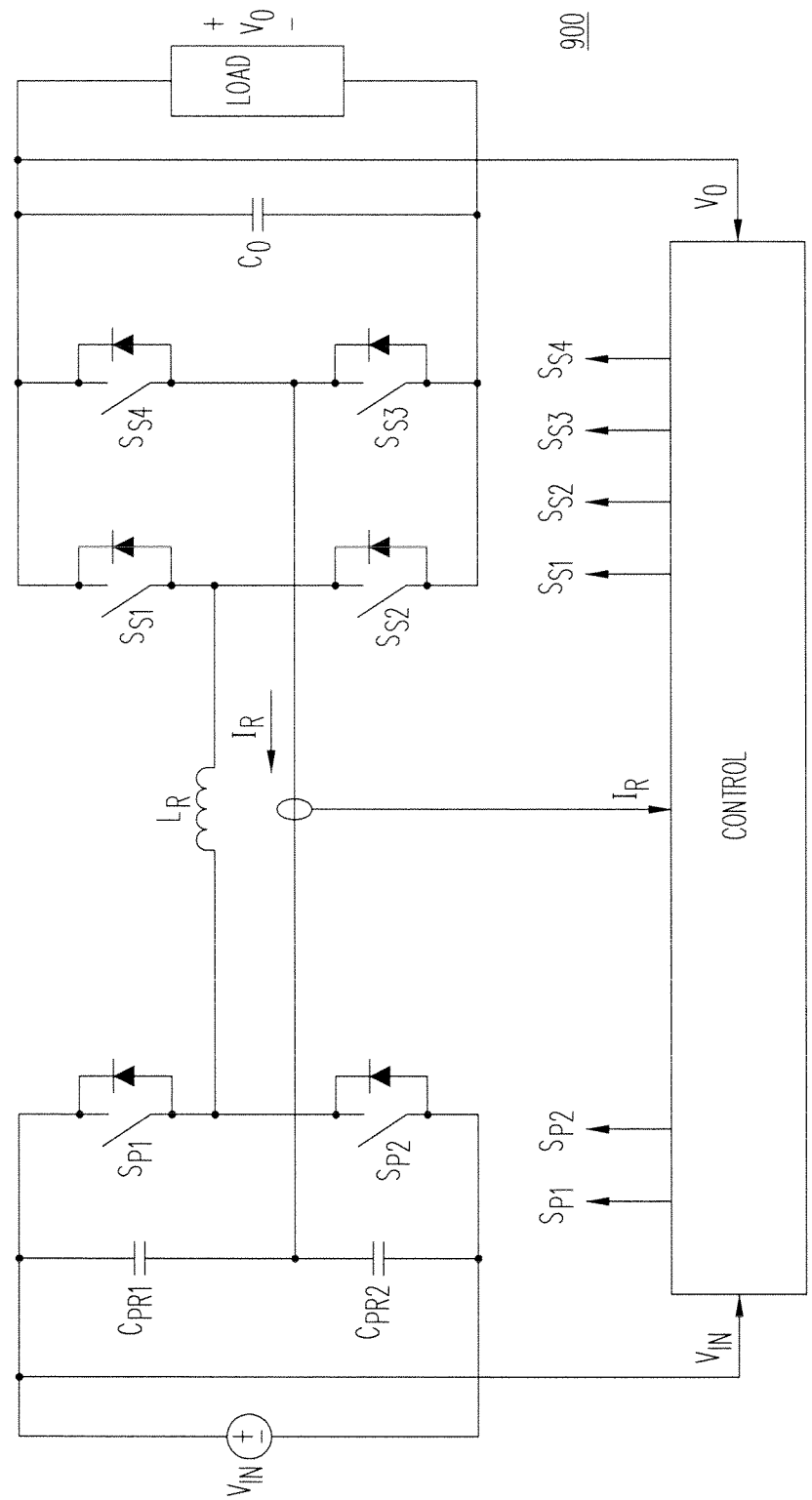
FIG. 9 shows full-bridge non-isolated resonant converter 900 with a full-wave rectifier, controlled according to one embodiment of the present invention.

The control methods of the present invention are also applicable to non-isolated series-resonant converters, such as resonant converter 900 of FIG. 9. FIG. 9 shows full-bridge non-isolated resonant converter 900 with a full-wave rectifier, controlled according to one embodiment of the present invention. In non-isolated converter 900 of FIG. 9, time-delay control is implemented by (i) sensing the zero crossings of the resonant-tank current, and (ii) delaying the turning-on of the corresponding rectifier switch by an amount of time based on the input voltage, the output voltage, or both.

Figure 10:
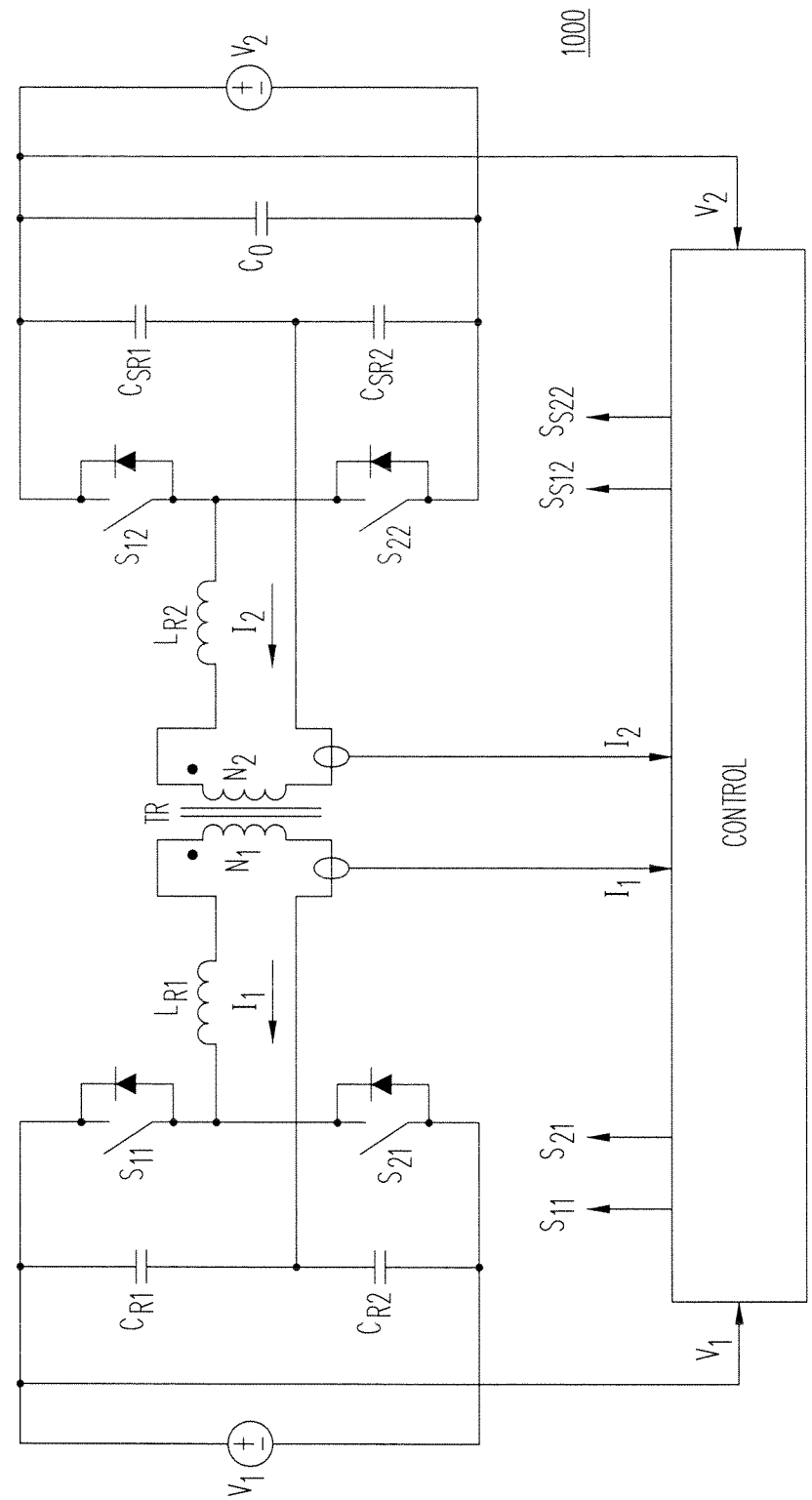
FIG. 10 shows a symmetrical bidirectional half-bridge resonant converter, controlled according to one embodiment of the present invention.

Resonant converters with secondary-side switches controlled according to the methods of the present invention are inherently bidirectional (i.e., such converters are capable of transferring power in either direction). In some isolated converters, bidirectional power control may require sensing of currents on both sides of the transformer. In addition, for some isolated topologies, additional control for flux-balancing in the transformer core may be necessary. FIG. 10 shows a symmetrical bidirectional half-bridge resonant converter to which the methods of the present invention are applicable. The waveforms for the switch control signals in the converter of FIG. 10 according to the present invention are the same for either power flow direction. Specifically, upon identification of the power flow direction, the control signals for the appropriately identified primary and secondary switches may be applied and the current from the appropriately identified side of the transformer may be sensed according to the waveforms shown in FIG. 3.

Figure 11A:
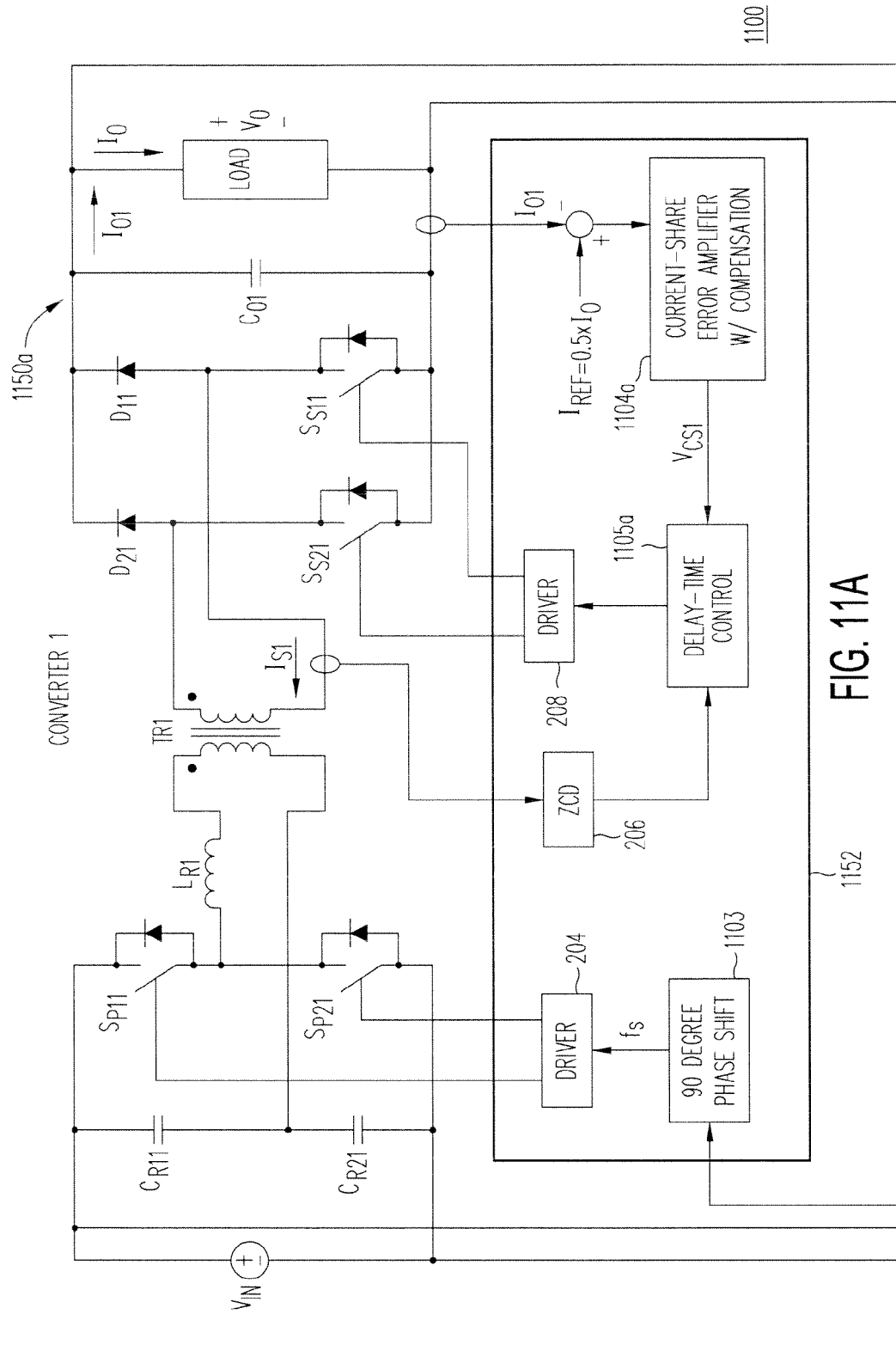
FIG. 11 shows two series-resonant converters connected between common input voltage source $V_{IN}$ and a common output load, controlled according to one embodiment of the present invention.
Figure 12:
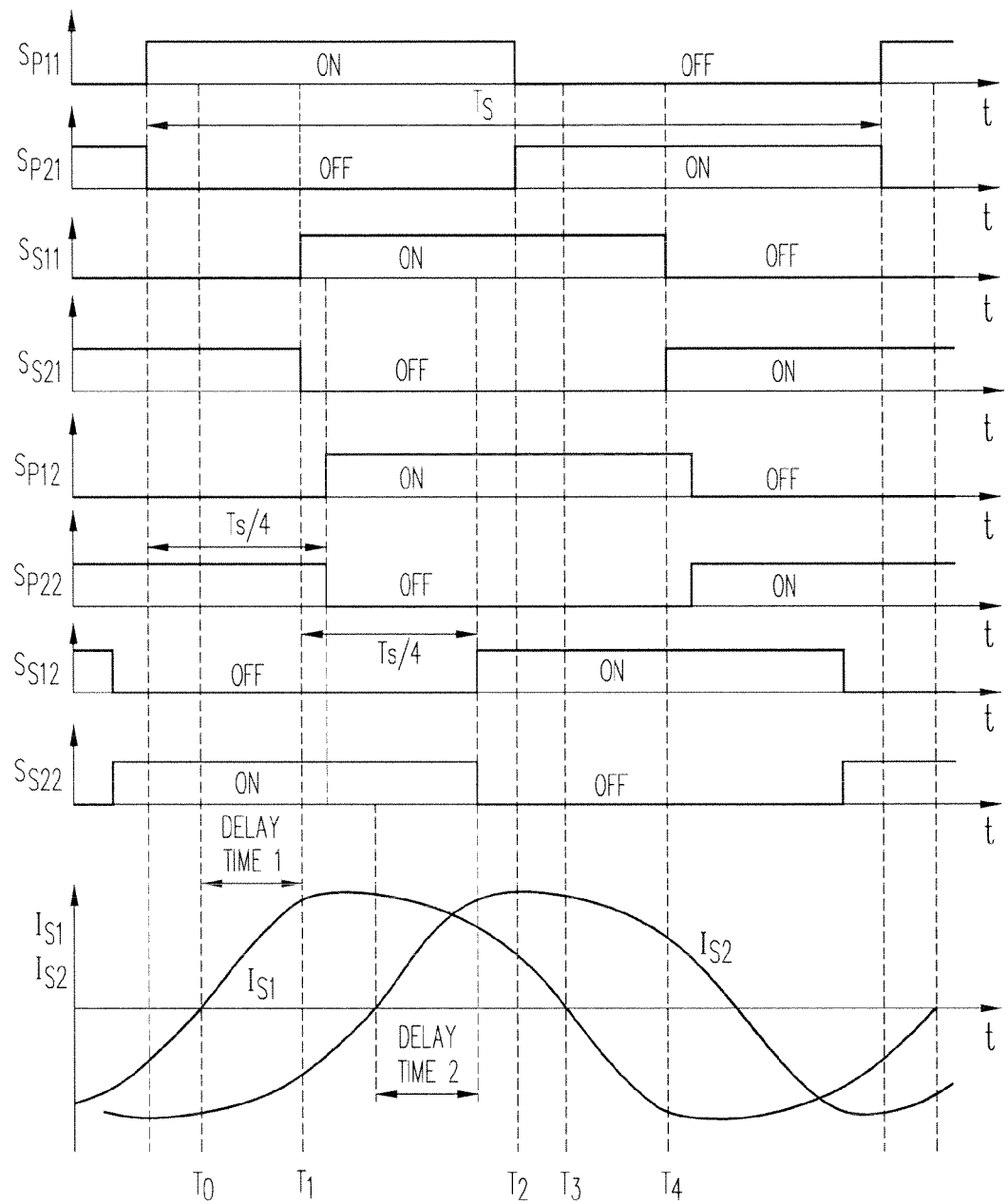
FIG. 12 shows waveforms of (i) primary switches $S_{P11}$ and $S_{P21}$, secondary switches $S_{S11}$ and $S_{S21}$, and secondary current $I_{S1}$ in resonant converter 1150a of FIG. 11, and (ii) primary switches $S_{P12}$ and $S_{P22}$, secondary switches $S_{S12}$ and $S_{S22}$, and secondary current $I_{S2}$ in resonant converter 1150b of FIG. 11, according to one embodiment of the present invention.

The delay-time control of the present invention may also be used to control active load current-sharing in paralleled or interleaved resonant converters, i.e., to make and to maintain the output currents of paralleled or interleaved resonant converters to be substantially balanced. FIG. 11 shows series-resonant converters 1150a and 1150b connected between common input voltage source $V_{IN}$ and a common output load. Conventional variable-frequency feedback control may be used to regulate the output voltage. As shown in FIG. 11, paralleled converters 1150a and 1150b operate with the same switching frequency $f_S$, which is set by output-voltage controller 1151 that includes output-voltage error amplifier with compensation circuit 1101 and VCO 1102. Frequency $f_S$ at VCO 1102 is determined by output-voltage error amplifier with compensation circuit 1101 based on a voltage difference between scaled sensed output voltage $V_{O(scld)}$ and reference voltage $V_{REF}$. Interleaving is implemented by offsetting the waveforms of the control signals in the corresponding primary switches of the two converters by about 90° (e.g., by about one-quarter of the switching period $T_S/4$), as shown in FIG. 12. FIG. 12 shows waveforms of (i) primary switches $S_{P11}$ and $S_{P21}$, secondary switches $S_{S11}$ and $S_{S21}$, and secondary current $I_S$, in resonant converter 1150*a* of FIG. 11, and (ii) primary switches $S_{P12}$ and $S_{P22}$, secondary switches $S_{S12}$ and $S_{S22}$, and secondary current $I_{S2}$ in resonant converter 1150*b* of FIG. 11, according to one embodiment of the present invention.

In the interleaved resonant converters of FIG. 11, both the secondary current and the output current are sensed in each resonant converter. The output current of each converter is compared with current reference $I_{REF}$ that corresponds to ideal current sharing (i.e., one-half of load current $I_O$, or $I_{REF}=I_O/2$). For each converter, the difference or "error" between the actual output current and current reference $I_{REF}$ is processed by the corresponding current sharing error amplifier with compensation circuit (i.e., circuit 1104*a* or 1104*b*). In each converter, the result sets in delay time control circuits 1105*a* and 1105*b* the delay times of the respective secondary switches relative to the corresponding secondary-current zero crossings. Since the typical current mismatch between parallel converters is relatively small, the delay times required for current balancing are also relatively short. Scaling, filtering, and other conditioning of the individual sensed output currents that may be required are performed in the respective current sharing error amplifier with compensation circuits (i.e., circuit 1104*a* and circuit 1104*b*). If the sensed output currents are scaled, the current reference in each converter also needs to be appropriately scaled. Alternatively, instead of sensing the output current, active current sharing control according to the present invention may also sense another current that is proportional to the output current. Examples of such an alternative current to be sensed include a rectified secondary current, the secondary current, or the primary current. The accuracy of controlling current-sharing may be affected, however, by the choice of sensing current. Generally, sensing the output current indirectly reduces control accuracy.

Figure 13A:
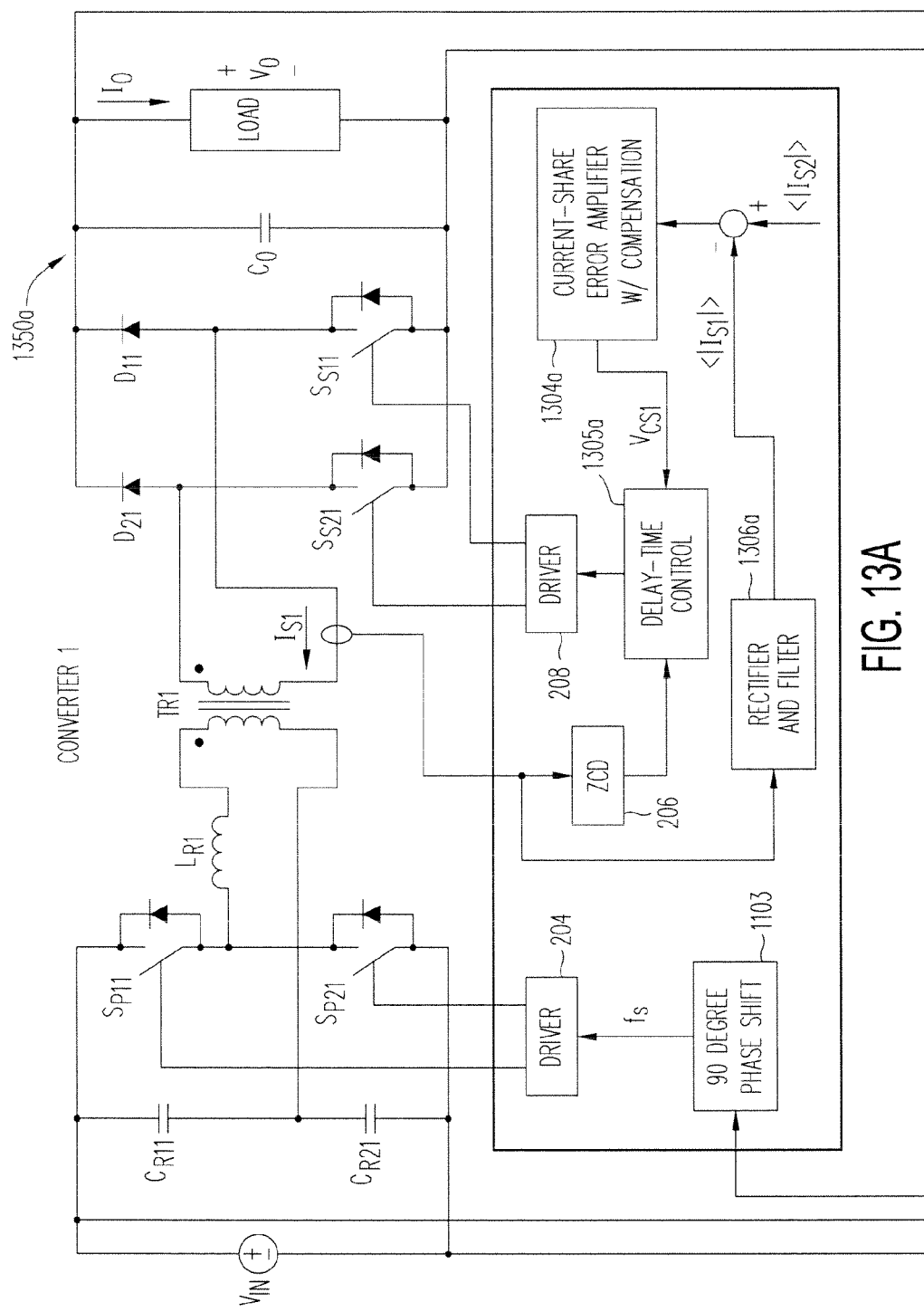
FIG. 13 shows delay-time control to allow active load current-sharing between interleaved converters, in accordance with a second embodiment of the present invention.

FIG. 13 shows delay-time control to allow active load current-sharing between paralleled converters 1350*a* and 1350*b*, in accordance with a second embodiment of the present invention. As shown in FIG. 13, the output currents of the paralleled converters 1350*a* and 1350*b* are not sensed directly. Instead, the output currents are obtained indirectly from sensed secondary currents $i_{S1}$ and $i_{S2}$. In FIG. 13, secondary currents $i_{S1}$ and $i_{S2}$ are rectified and filtered to provide rectified currents $<|i_{S1}|>$ and $<|i_{S2}|>$, which are proportional to corresponding output currents. The difference between rectified currents $<|i_{S1}|>$ and $<|i_{S2}|>$ are processed by the respective current-sharing error amplifier with compensation circuits 1304*a* and 1304*b*. Each current-sharing error amplifier with compensation circuit sets the delay time for the corresponding secondary switches relative to the secondary current zero crossings.

Figure 14A:
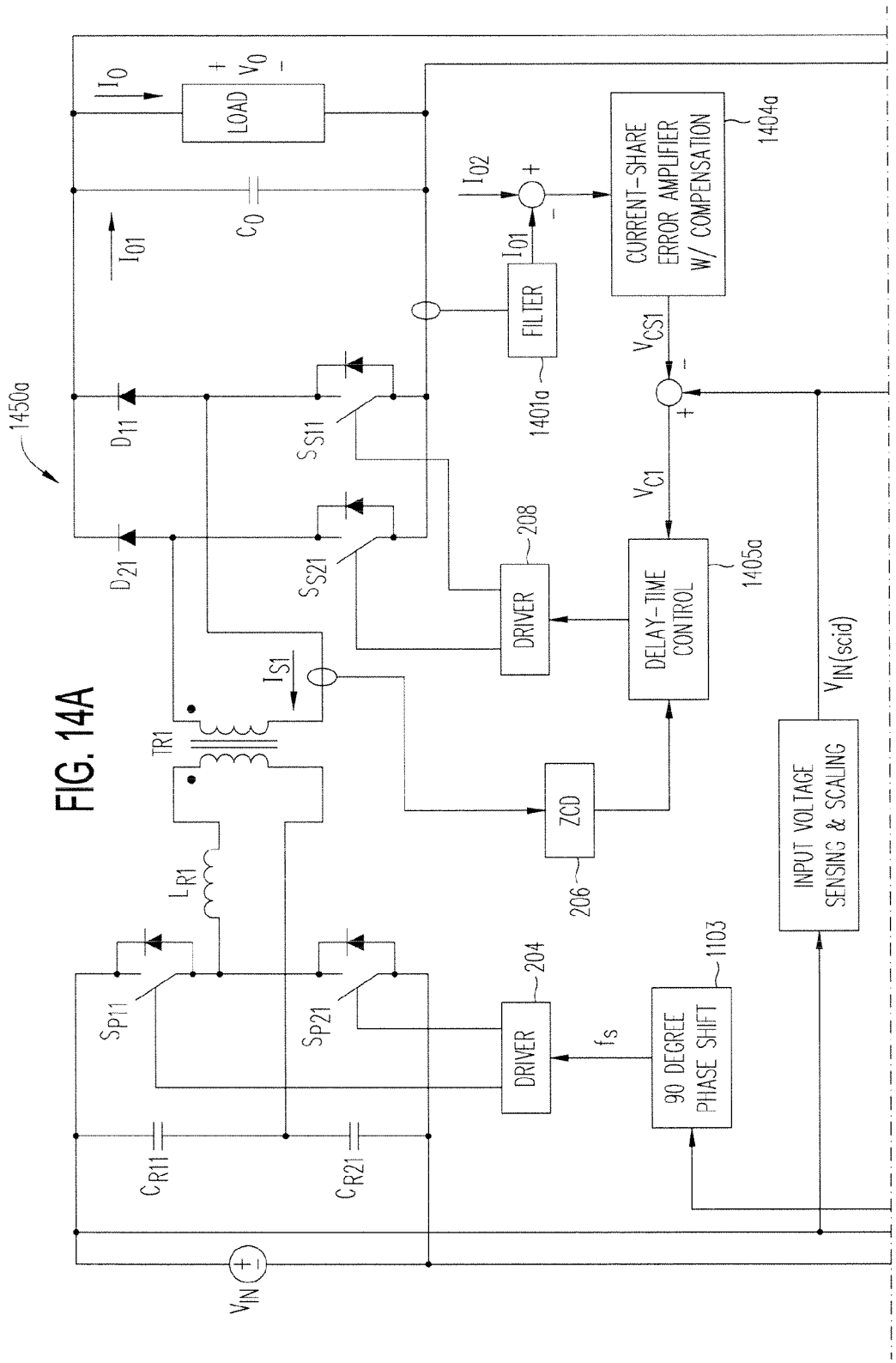
FIG. 14 shows delay-time control in interleaved converters 1450a and 1450b with wide input voltage range or wide output voltage range (or both) that achieves simultaneously both active current-sharing control and frequency-range reduction, in accordance with one embodiment of the present invention.

FIG. 14 shows delay-time control in parallel converters 1450*a* and 1450*b* with wide input voltage range or wide output voltage range (or both) that achieves simultaneously both active current-sharing control and frequency-range reduction, in accordance with one embodiment of the present invention. As shown in FIG. 14, in addition to active current-sharing control, delay-time control may be used to reduce the frequency range of two interleaved converters 1450*a* and 1450*b* with a wide input voltage range. Frequency range reduction is achieved by making the delay time responsive to both the input voltage and the output current of each paralleled converter. In the exemplary embodiment of FIG. 14, current-sharing control is implemented by processing a difference between sensed rectified output currents $i_{O1}$ and $i_{O2}$ The difference between rectified output currents $i_{O1}$ and $i_{O2}$ are taken after each current has been low-pass filtered to extract their respective average values.

Figure 15:
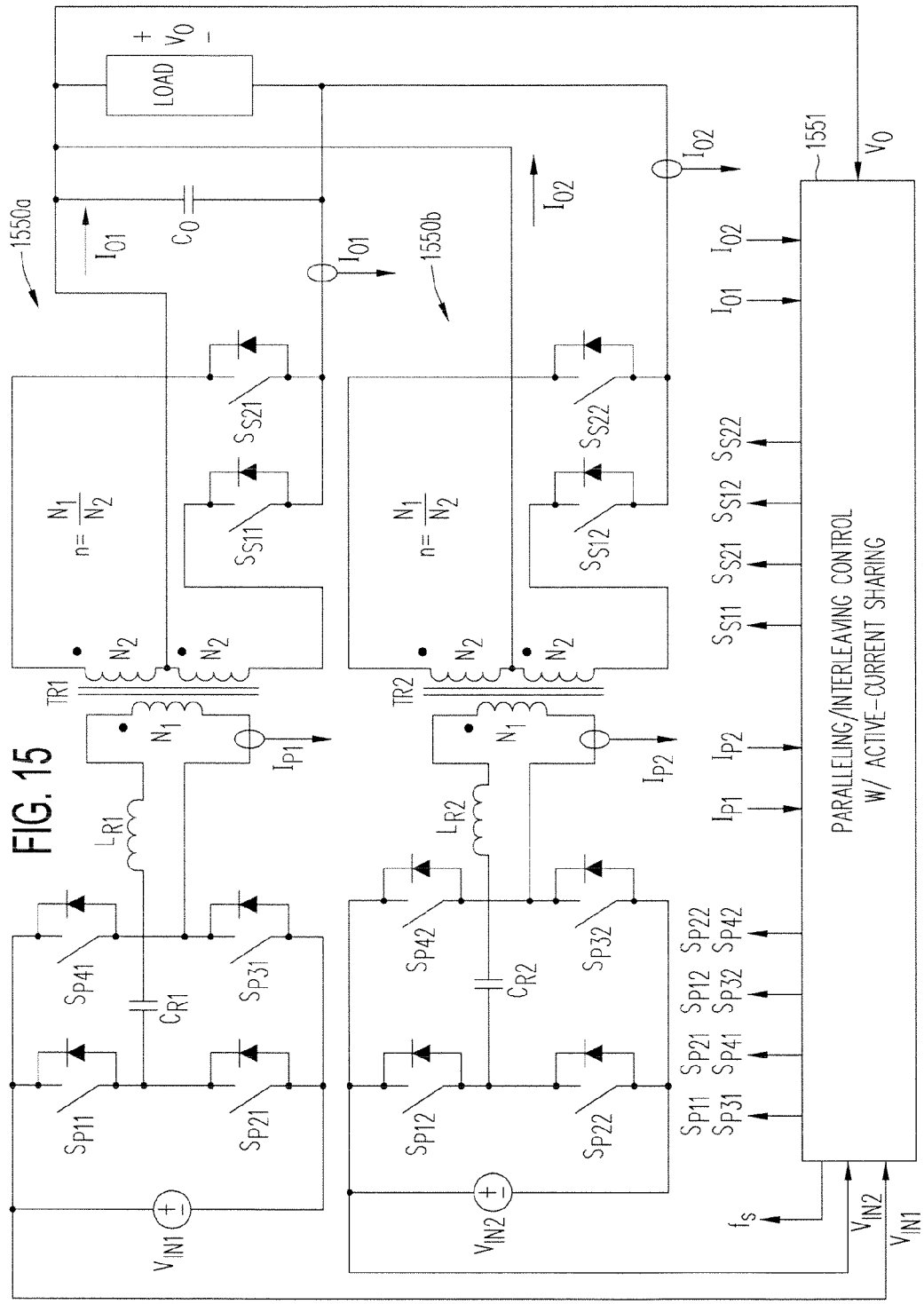
FIG. 15 shows active current-sharing control for interleaved converters 1550a and 1550b having independent input sources, in accordance with one embodiment of the present invention.
Figure 16:
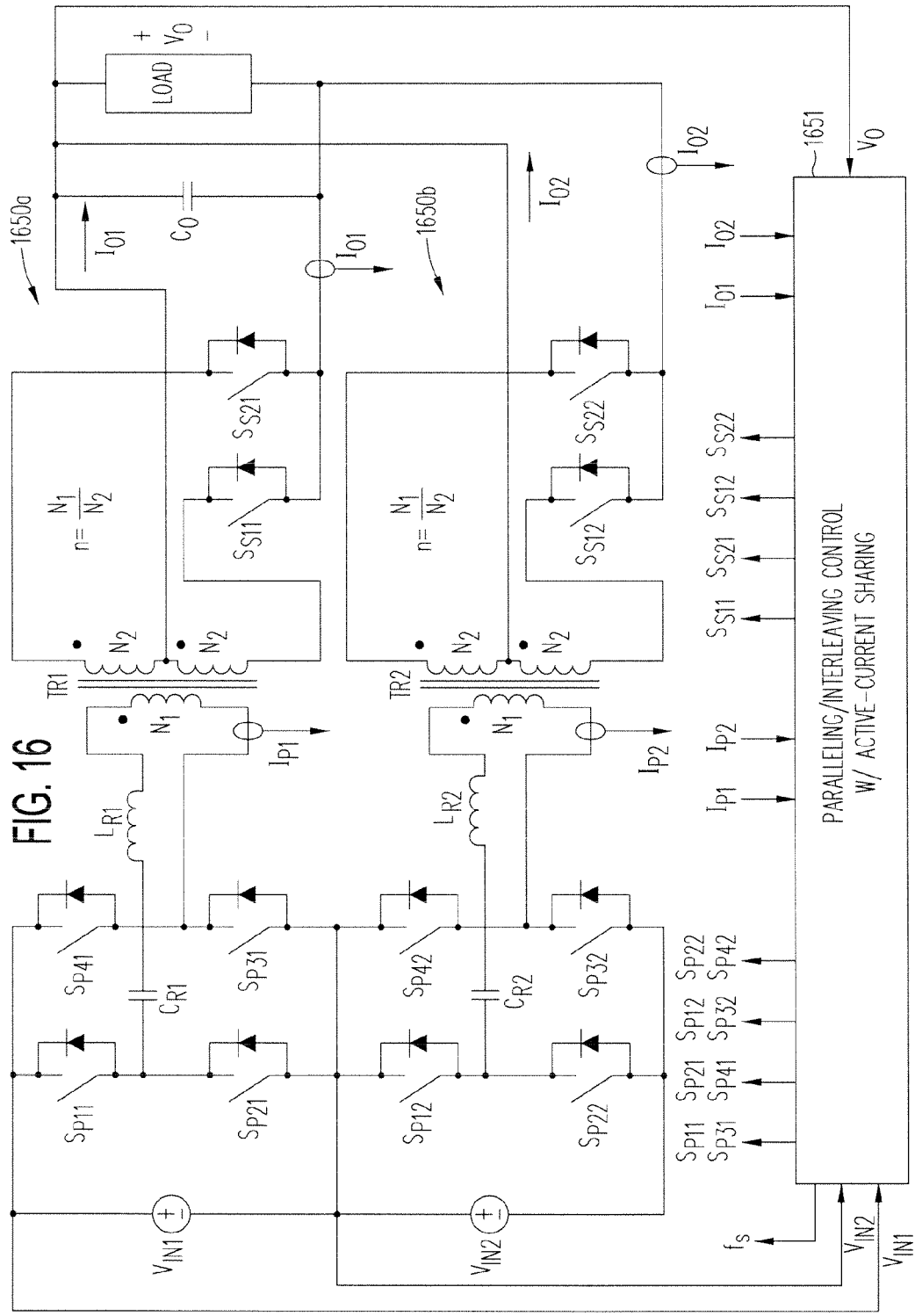
FIG. 16 shows active current-sharing control for interleaved converters 1650a and 1650b supplied by stacked input sources, in accordance with one embodiment of the present invention.

Active current-sharing control of the present invention may be implemented in multiple converters having output terminals connected in parallel and input voltages supplied from different voltage sources, as shown in the exemplary embodiments of FIGS. 15 and 16. FIG. 15 shows active current-sharing control for converters 1550*a* and 1550*b* having independent input sources, in accordance with one embodiment of the present invention. FIG. 16 shows active current-sharing control for converters 1650*a* and 1650*b* supplied by stacked input sources, in accordance with one embodiment of the present invention.

Stacked input sources $V_{IN1}$ and $V_{IN2}$ of FIG. 16 may be, for example, serially connected capacitors that are coupled to a common input source $V_{IN}$. The delay-time control method of the present invention may be used to balance the voltages across these capacitors. In this input-capacitor voltage balancing control, the two converters regulate the output voltage by frequency control, while each converter regulates its input voltage across the corresponding input capacitor. Output voltage regulation may be achieved using an error difference between output voltage $V_O$ and desired reference voltage $V_{REF(OUT)}$. In addition, the error difference may also be used to adjust the switching frequency for the two converters. Interleaving is implemented by offsetting the waveforms of the control signals in the corresponding primary switches of the two converters by about 90°. The input capacitor voltage is regulated by processing an error difference between the input capacitor voltage and desired reference voltage $V_{REF(IN)}$ derived from sensing the input voltage via a sensing and scaling network. The error difference determines a delay time adjusted to a value necessary to achieve and maintain the desired input voltage. By selecting reference voltage $V_{REF(IN)}$ to be $V_{IN}/2$ (e.g., from a voltage divider formed by equal resistors), converters 1650*a* and 1650*b* can achieve perfectly balanced input voltages.

Stacked input sources may be serially connected multiple capacitors that are coupled to a common input source $V_{IN}$. The delay-time control method of the present invention may be used to balance the voltages across these capacitors. The converters regulate the output voltage by frequency control with interleaving operation, while each converter regulates its input voltage across the corresponding input capacitor.

The above detailed description is provided to illustrate specific embodiments of the present invention and is not intended to be limiting. Numerous variations and modifications within the scope of this invention are possible. The present invention is set forth in the following claims.

We claim:

1. A resonant converter receiving an input voltage and providing an output voltage, comprising:
   a resonant tank circuit for deriving energy from the input voltage;
   a transformer coupled to the resonant tank circuit, wherein the transformer has a primary winding and a secondary winding, the secondary winding having a first terminal and a second terminal;

a first set of switches configured to transfer energy to the resonant tank circuit, the first set of switches switching at a frequency responsive to the output voltage;

a second set of switches coupled to the secondary winding of the transformer, the second set of switches configured to transfer energy from the resonant tank to the output voltage and to provide a full-bridge rectifier; and a control unit controlling the second set of switches based on a delay time relative to a time of occurrence of an event in a sensed signal representing a current in the resonant tank circuit and based on at least one of: the input voltage, the output voltage, and the sensed signal, wherein, during a predetermined period of the delay time, the control unit operates the second set of switches such that the first and second terminals of the secondary winding are shorted through the second set of switches.

2. The resonant converter of claim 1, wherein the control unit comprises a microprocessor.

3. The resonant converter of claim 1, wherein the delay time is relative to zero crossings in the current.

4. The resonant converter of claim 1, wherein the first set of switches comprises one or more pair of switches each switching in a non-overlapping fashion.

5. The resonant converter of claim 1, wherein the resonant tank circuit comprises one or more resonant capacitors and one or more resonant inductors.

6. The resonant converter of claim 5, wherein the first set of switches is configured in a full-bridge topology.

7. The resonant converter of claim wherein the first set of switches is configured in a half-bridge topology.

8. The resonant converter of claim 5, wherein the first set of switches and the second set of switches are each turned on at zero voltage.

9. The resonant converter of claim 5, wherein the one or more resonant capacitors and the one or more resonant inductors are coupled to the primary winding of the transformer and one or more resonant capacitors and one or more resonant inductors are coupled to the secondary winding of the transformer.

10. The resonant converter of claim 1, wherein the sensed signal is derived from the primary winding of the transformer.

11. The resonant converter of claim 1, wherein the sensed signal is derived from the secondary winding of the transformer.

12. The resonant converter of claim 1, wherein the sensed signal is derived from currents in both the primary winding of the transformer and the secondary winding of the transformer.

13. The resonant converter of claim 1, wherein the control unit further adjusts the delay time to balance flux in the transformer.

14. The resonant converter of claim 1, wherein the first set of switches switch at a frequency responsive to at least one of the currents in the primary winding of the transformer and the secondary winding of the transformer.

15. The resonant converter of claim 1, wherein the control unit further adjusts the delay time according to the voltage across the load relative to a reference output voltage.

16. The resonant converter of claim 1, wherein the resonant converter is bidirectional.

17. The resonant converter of claim 1, wherein at least one of: the input voltage, and the output voltage, and the sensed signal is detected through wireless communication.

18. A power converter supplying power to a load, comprising at least a first resonant converter, and a second resonant converter, wherein:

(i) the first resonant converter receives an input voltage and provides an output voltage across the load, the first resonant converter comprising:

a resonant tank circuit for deriving energy from the input voltage;

a transformer coupled to the resonant tank circuit, wherein the transformer has a primary winding and a secondary winding, the secondary winding having a first terminal and a second terminal;

a first set of switches configured to transfer energy from the input voltage to the resonant tank;

a second set of switches coupled to the secondary winding of the transformer, the second set of switches configured to transfer energy from the resonant tank to the load and to provide a full-bridge rectifier; and a control unit controlling the second set of switches based on a delay time relative to a time of occurrence of an event in a sensed signal representing a current in the resonant tank circuit and based on a control parameter responsive to both the sensed signal of the first resonant converter and a sensed signal of the second resonant converter, wherein, during a predetermined period of the delay time, the control unit operates the second set of switches such that the first and second terminals of the secondary winding are both shorted to through the second set of switches; and (ii) the second resonant converter receives an input voltage and provides an output voltage, the second resonant converter being connected in parallel to the first resonant converter across the load, the second resonant converter comprising:

a resonant tank circuit for deriving energy from the input voltage;

a transformer coupled to the resonant tank circuit, wherein the transformer has a primary winding and a secondary winding, the secondary winding having a first terminal and a second terminal;

a first set of switches configured to transfer energy from the input voltage to the resonant tank;

a second set of switches coupled to the secondary winding of the transformer, the second set of switches configured to transfer energy from the resonant tank to the load and to provide a full-bridge rectifier; and a control unit controlling the second set of switches based on a delay time relative to a time of occurrence of an event in the sensed signal which represents a current in the resonant tank circuit and based on a control parameter responsive to both the sensed signal of the first resonant converter and the sensed signal of the second resonant converter, wherein, during a predetermined period of the delay time, the control unit operates the second set of switches such that the first and second terminals of the secondary winding are shorted through the second set of switches.

19. The power converter of claim 18, wherein switching in the first set of switches in the first resonant converter lag switching in the first set of switches in the second resonant converters by approximately 90°.

20. The power converter of claim 18, wherein the first set of switches of the first resonant converter and the first set of switches in the second resonant converter switch at a frequency responsive to a voltage across the load.

21. The power converter of claim 18, wherein the first set of switches of the first resonant converter and the first set of switches in the second resonant converter switch at a frequency responsive to a current through the load.

22. The power converter of claim 18, wherein the control parameter for each resonant converter is based in part on the load current.

23. The power converter of claim 18, wherein the control parameter for each resonant converter is based in part on at least one of an output current of the first resonant converter and an output current of the second resonant converter.

24. The power converter of claim 18, wherein one or more resonant capacitors and one or more resonant inductors are coupled to the primary winding of the transformer and one or more resonant capacitors and one or more resonant inductors are coupled to the secondary winding of the transformer.

25. The power converter of claim 18, wherein the control parameter for each resonant converter is based in part on currents on the secondary winding of the first resonant converter and on the secondary winding of the second resonant converter.

26. The power converter of claim 18, wherein the control parameter for each resonant converter is based in part on rectified currents on the secondary winding of the first resonant converter and on the secondary winding of the second resonant converter.

27. The power converter of claim 18, wherein the control parameter for each resonant converter is based in part on currents on the primary winding of the first resonant converter and on the primary winding of the second resonant converter.

28. The power converter of claim 18, wherein the control parameter for each resonant converter is further responsive to at least one of the input voltage of the first resonant converter and the input voltage of the second resonant converter.

29. The power converter of claim 18, wherein the input voltage of the first resonant converter and the input voltage of the second resonant converter are derived from independent voltage sources.

30. The power converter of claim 18, wherein the input voltage of the first resonant converter and the input voltage of the second resonant converter are derived from connected voltage sources.

31. The power converter of claim 30, wherein the connected voltage sources comprise capacitors serially connected across a common voltage source.

32. The power converter of claim 31, wherein the control unit of the first resonant converter and the control unit of the second resonant converter further regulate the input voltages relative to a reference input voltage.

33. The power converter of claim 32, wherein the control unit of the first resonant converter and the control unit of the second resonant converter further adjust the delay time according to the reference input voltage.

34. The power converter of claim 32, wherein the reference input voltage is one-half the common voltage source.

35. The power converter of claim 18, wherein the control unit of the first resonant converter and the control unit of the second resonant converter further regulate a voltage across the load relative to a reference output voltage.

* * * * *